United States Patent
Senba

(10) Patent No.: US 8,159,559 B2
(45) Date of Patent: Apr. 17, 2012

(54) IMAGE PICK-UP APPARATUS WITH SYNCHRONIZATION, IMAGE PICK-UP METHOD AND RECORDING MEDIUM

(75) Inventor: Takehiko Senba, Kurokawa-gun (JP)

(73) Assignee: Fujifilm Corporation, Tokyo (JP)

( * ) Notice: Subject to any disclaimer, the term of this patent is extended or adjusted under 35 U.S.C. 154(b) by 503 days.

(21) Appl. No.: 12/401,281

(22) Filed: Mar. 10, 2009

(65) Prior Publication Data

US 2009/0231465 A1 Sep. 17, 2009

(30) Foreign Application Priority Data

Mar. 11, 2008 (JP) ................................. 2008-061017

(51) Int. Cl.
*H04N 5/235* (2006.01)
(52) U.S. Cl. ..................... 348/229.1; 348/239
(58) Field of Classification Search .................. 348/362, 348/363, 364, 239, 229.1, 227.1
See application file for complete search history.

(56) References Cited

U.S. PATENT DOCUMENTS

| | | | | |
|---|---|---|---|---|
| 6,101,333 | A * | 8/2000 | Bullitt et al. .................... | 396/61 |
| 6,529,640 | B1 * | 3/2003 | Utagawa et al. ............... | 382/284 |
| 2007/0064116 | A1 * | 3/2007 | Muraki ....................... | 348/220.1 |
| 2007/0071424 | A1 * | 3/2007 | Poon et al. ...................... | 396/52 |

FOREIGN PATENT DOCUMENTS

| | | |
|---|---|---|
| JP | 05-173056 A | 7/1993 |
| JP | 05-173221 A | 7/1993 |
| JP | 05-173227 A | 7/1993 |
| JP | 07-131799 A | 5/1995 |
| JP | 10-262182 A | 9/1998 |
| JP | 11-098418 A | 4/1999 |
| JP | 2000-078460 A | 3/2000 |
| JP | 2000-078463 A | 3/2000 |
| JP | 2000-307941 A | 11/2000 |
| JP | 2001-157109 A | 6/2001 |

OTHER PUBLICATIONS

Japanese Office Action dated Sep. 28, 2011 issued in a corresponding Japanese Patent Application No. 2008-061017.

* cited by examiner

*Primary Examiner* — Nelson D. Hernández Hernández
(74) *Attorney, Agent, or Firm* — Sughrue Mion, PLLC

(57) ABSTRACT

Image light from an object is dispersed by a light dispersing device. When a plurality of image sensors are used for picking up images, an image in which a moving object is stopped is picked up with a high shutter speed, and at the same time, a motion-blurred image in which the moving object is picked up at a slow shutter speed. The obtained images are synthesized. The synthesized image has a slow synchronized flash effect. Accordingly, an image having a slow synchronized flash effect can be obtained without using a flash.

25 Claims, 24 Drawing Sheets

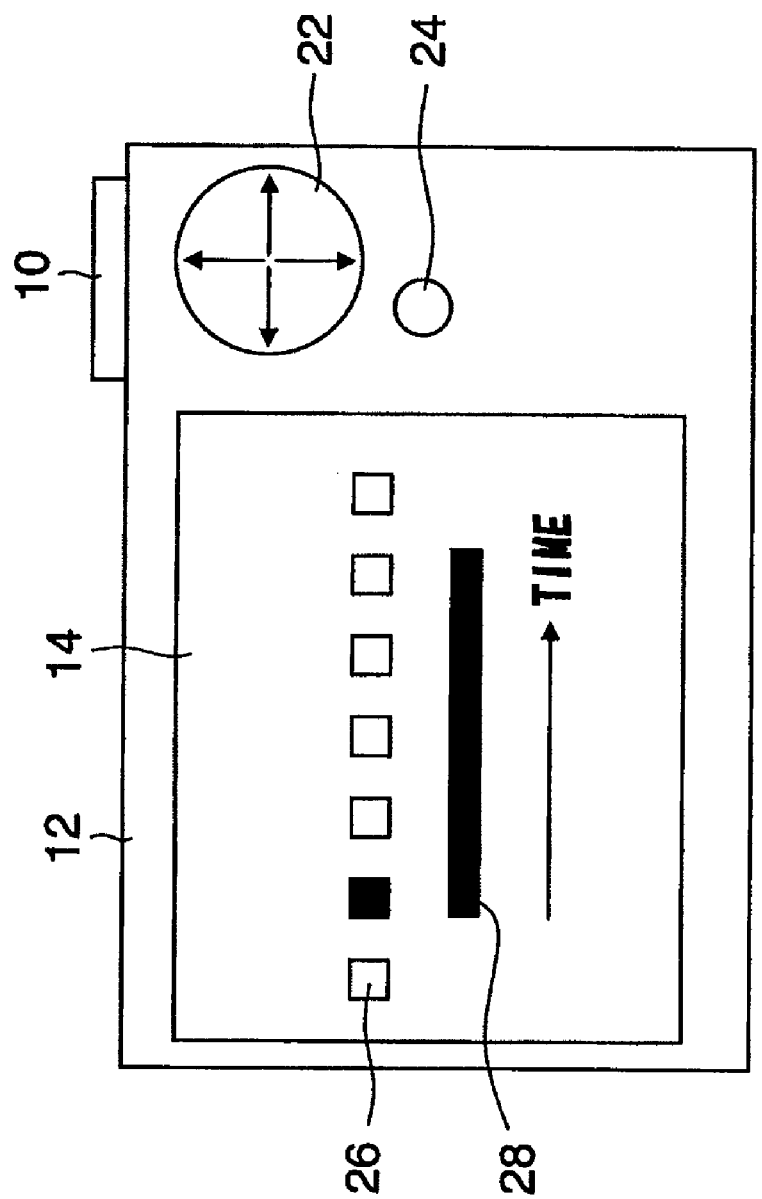

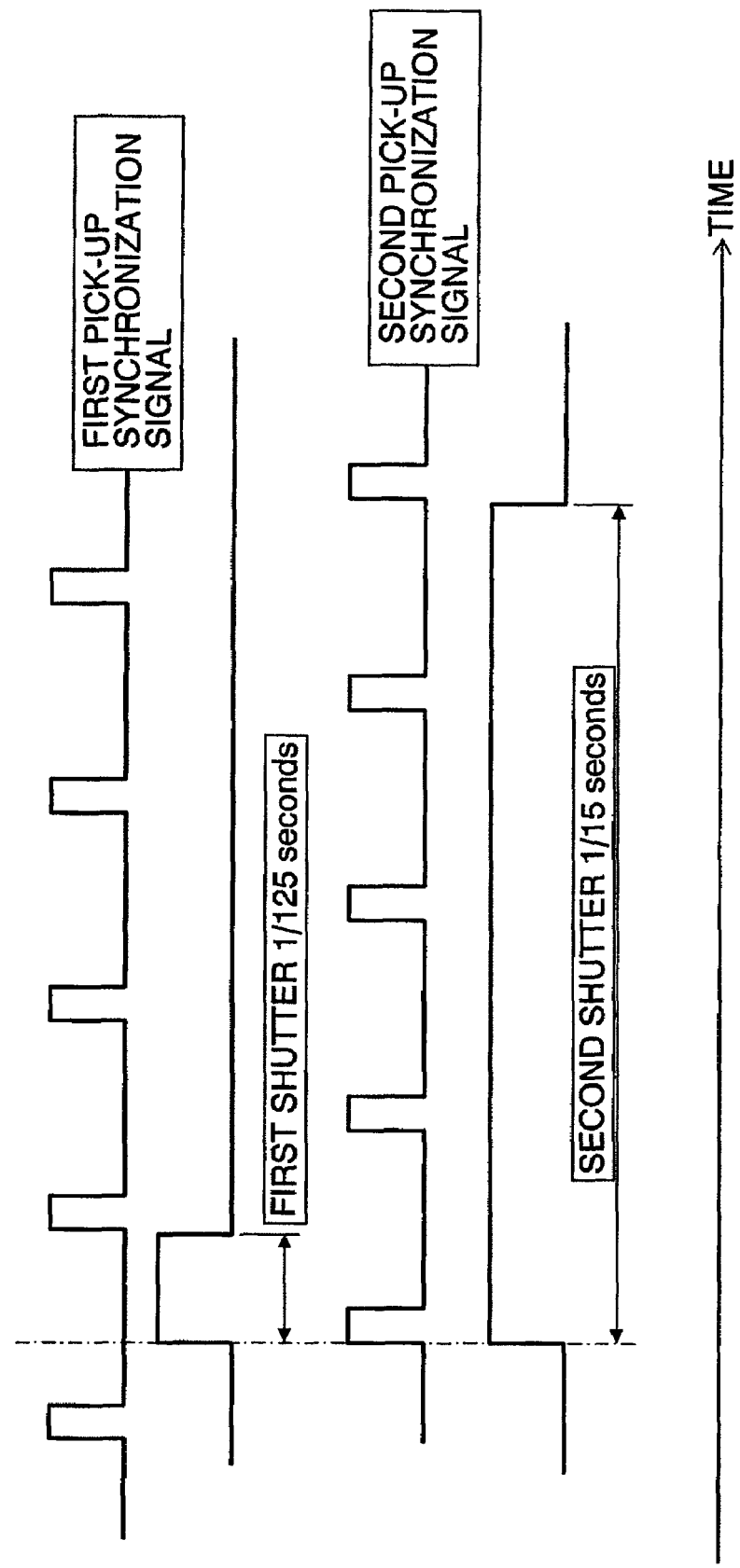

FIG.12

TABLE FOR FIRST AND SECOND SHUTTER SPEEDS

| BRIGHTNESS OF OBJECT | FIRST EXPOSURE CONDITION | | | SECOND EXPOSURE CONDITION | | |
|---|---|---|---|---|---|---|
| | EV | SHUTTER SPEED Tv | APERTURE Av | EV | SHUTTER SPEED Tv | APERTURE Av |
| 9EV | 8 | 7 | 1 | 8 | 4 | 4 |
| 10EV | 9 | 7 | 2 | 9 | 4 | 5 |
| 11EV | 10 | 7 | 3 | 10 | 4 | 6 |
| 12EV | 11 | 7 | 4 | 11 | 4 | 7 |
| 13EV | 12 | 7 | 5 | 12 | 4 | 8 |
| 14EV | 13 | 7 | 6 | 13 | 4 | 9 |
| 15EV | 14 | 7 | 7 | 14 | 4 | 10 |
| 16EV | 15 | 7 | 8 | 15 | 4 | 11 |

FIG.15

TABLE FOR FIRST AND SECOND SHUTTER SPEEDS

| BRIGHTNESS OF OBJECT | FIRST EXPOSURE CONDITION ||||| SECOND EXPOSURE CONDITION ||||
|---|---|---|---|---|---|---|---|---|---|
| | EV | SHUTTER SPEED Tv | APERTURE Av | ISO SENSITIVITY Sv | EV | SHUTTER SPEED Tv | APERTURE Av | ISO SENSITIVITY Sv |
| 1EV | 0 | 6 | 3 | 9 | 0 | 3 | 3 | 6 |
| 2EV | 1 | 6 | 3 | 8 | 1 | 3 | 3 | 5 |
| 3EV | 2 | 6 | 3 | 7 | 2 | 3 | 3 | 4 |
| 4EV | 3 | 6 | 3 | 6 | 3 | 3 | 3 | 3 |
| 5EV | 4 | 6 | 3 | 5 | 4 | 3 | 3 | 2 |
| 6EV | 5 | 6 | 3 | 4 | 5 | 3 | 3 | 1 |
| 7EV | 6 | 6 | 3 | 3 | 6 | 3 | 3 | 0 |
| 8EV | 7 | 6 | 3 | 2 | 7 | 3 | 6 | 2 |
| 9EV | 8 | 6 | 3 | 1 | 8 | 3 | 6 | 1 |
| 10EV | 9 | 6 | 3 | 0 | 9 | 3 | 6 | 0 |
| 11EV | 10 | 7 | 3 | 0 | 10 | 4 | 6 | 0 |
| 12EV | 11 | 8 | 3 | 0 | 11 | 5 | 6 | 0 |
| 13EV | 12 | 9 | 3 | 0 | 12 | 6 | 6 | 0 |
| 14EV | 13 | 10 | 3 | 0 | 13 | 7 | 6 | 0 |
| 15EV | 14 | 10 | 4 | 0 | 14 | 7 | 7 | 0 |
| 16EV | 15 | 10 | 5 | 0 | 15 | 7 | 8 | 0 |

FIG.18

TABLE FOR EXPOSURE OF FIRST AND SECOND IMAGE SENSORS

| BRIGHTNESS OF OBJECT | SHADING OF MOTIONLESS IMAGE | FIRST EXPOSURE CONDITION | | | | SECOND EXPOSURE CONDITION | | | |
|---|---|---|---|---|---|---|---|---|---|
| | | EV | SHUTTER SPEED Tv | APERTURE Av | ISO SENSITIVITY Sv | EV | SHUTTER SPEED Tv | APERTURE Av | ISO SENSITIVITY Sv |
| 10EV | DEEP | 8.5 | 7 | 6 | 4.5 | 9.4 | 4 | 6 | 0.6 |
| | AVERAGE | 9 | 7 | 6 | 4 | 9 | 4 | 6 | 1 |
| | LIGHT | 9.5 | 7 | 6 | 3.5 | 8.2 | 4 | 6 | 1.8 |
| 11EV | DEEP | 9.5 | 7 | 6 | 3.5 | 10.4 | 4 | 6 | -0.4 |
| | AVERAGE | 10 | 7 | 6 | 3 | 10 | 4 | 6 | 0 |
| | LIGHT | 10.5 | 7 | 6 | 2.5 | 9.2 | 4 | 6 | 0.8 |

FIG.20

| TABLE OF RATIO OF IMAGES OF FIRST AND SECOND IMAGE SENSORS | | RATIO FOR IMAGE OF FIRST IMAGE SENSOR | RATIO FOR IMAGE OF SECOND IMAGE SENSOR |
|---|---|---|---|
| SHADING OF MOTIONLESS IMAGE | DEEP | 1.2 | 0.8 |
| | AVERAGE | 1 | 1 |
| | LIGHT | 0.8 | 1.2 |

FIG.23

| MOTION-BLUR EFFECT CONVERSION TABLE | |
|---|---|
| | DIFFERENCE BETWEEN FIRST AND SECOND SHUTTER SPEEDS |
| SLIGHTLY EFFECTIVE | FIRST Tv VALUE − SECOND Tv VALUE = 2 |
| AVERAGE | FIRST Tv VALUE − SECOND Tv VALUE = 3 |
| GREATLY EFFECTIVE | FIRST Tv VALUE − SECOND Tv VALUE = 4 |

FIG.24

| MOTION-BLUR EFFECT CONVERSION TABLE EXAMPLE 2 | SECOND SHUTTER SPEED |
|---|---|
| SLIGHTLY EFFECTIVE | 1/30 seconds |
| AVERAGE | 1/15 seconds |
| GREATLY EFFECTIVE | 1/8 seconds |

IMAGE PICK-UP APPARATUS WITH SYNCHRONIZATION, IMAGE PICK-UP METHOD AND RECORDING MEDIUM

BACKGROUND OF THE INVENTION

1. Field of the Invention

The present invention relates to an image pick-up apparatus and an image pick-up method that enable to obtain a slow synchronized image using a plurality of image sensors.

2. Description of the Related Art

In recent years, owing to camera shake compensation and improvement of auto focus of a digital camera, even a beginner causes a substantially lower risk of picking up a camera-shaken image or a blurred image. This is because from demands by general users, the camera makers have made efforts on improvement of the cameras. However, some people who have interests in photographing demand to actively generate motion blur to express movements of an object or to obtain an image in which a motion-blurred image and an motionless image (non-motion-blurred image) appearing that the movement stops for a moment during the movement, co-exist. A shooting procedure of "slow synchronized flash" is a method to pick up such an image. In this method, an image is picked up while flash is being emitted to a moving object only for a short time. Thereby, in that image, the moving object appears to be motionless only in a moment the flash is being emitted while the object is taken motion-blurry. Since a time period when the flash is emitted is shorter than a shutter speed and a light amount is large, the motion-blur of the object stops only when the flash is emitted and the object is motion-blurred for the rest of time in the obtained image. The shutter speed is set to a slow shutter of about $1/15$ seconds so that a motion-blur of the object can be intentionally generated. The image obtained as such becomes dynamic, in which a motion-blurred image of a moving object and a motionless image of the object stopping its movement for a moment, co-exist.

A pick-up method using a plurality of image sensors includes a method for enlarging a dynamic range (Japanese Patent Application Laid-Open No. 7-131799). This invention aim to enlarge a dynamic range compared to an image picked up by one image sensor, by picking up image signals at different shutter speeds by the plurality of image sensors and combining the image signals.

SUMMARY OF THE INVENTION

However, the shooting procedure with the slow synchronized flash effect has a problem that a suitable image can not be obtained without an optimum light amount by flash and an optimum light amount by long exposure, and that the effect of the slow synchronized flash can not be obtained when a moving object is far away so that the flash light does not reach because the flash light can not stop motion-blur.

The purpose of the present invention is, considering the problems of the conventional technologies described above, to provide an image pick-up apparatus and an image pick-up method that enable a user, even if not a skilled one, to easily obtain an image having a same effect as the slow synchronized flash without using a flash.

To achieve the purpose described above, according to a first aspect of the present invention, an image pick-up apparatus includes: a first and a second image sensors for photo-electrically converting image light entering from an object via an image lens and outputting a first and a second image signals; a light dispersing device for dispersing the image light on a light path of the image light and causing the image light to enter the first and second image sensors; a first and a second exposure time control devices for controlling respective exposure time of the first and second image sensors; a photometering device for photometering brightness of the object; an exposure condition setting device for setting exposure times of the first and second image sensors based on the photometered brightness of the object by the photometering device, and for setting a first exposure time when motion-blur of a moving object is not generated and a second exposure time when the motion-blur is generated; an image pick-up control device for picking-up by controlling the first and second exposure time control device based on the first and second exposure time set by the exposure condition setting device; and an image synthesis device for synthesizing an image having a slow synchronized flash effect based on the first and second image signals output from the first and second image sensors after the photographing.

In the image pick-up apparatus according to the first aspect, image light entered from the object via the image lens is dispersed by the dispersing light device and caused to enter the first and second image sensors. The dispersed image lights are picked up in the first exposure time when the motion-blur of the moving object is not generated and in the second exposure time when the motion-blur is generated. The obtained first and second image signals are combined by the image synthesis device. Thus, without using a flash, an image having the slow synchronized flash effect which is synthesized from the motionless image and the dynamic image having the motion-blur, can be obtained.

Here, generally, the first exposure time for picking up the motionless image without motion-blur, is shorter than, for example, $1/125$ seconds. The second exposure time for intentionally generating motion-blur is longer than, for example, $1/15$ seconds. However, each optimum value of the first and second exposure times varies depending on a focal length of a lens, a distance from the object, a speed at which the object moves. According to the aspect, the first and second exposure times, that is, a shutter speeds are automatically set like a normal camera.

In the image pick-up apparatus according to the first aspect, it is preferred that at least the first exposure time of the first and second exposure times is changed according to the focal length of the image lens. The exposure time varies according to the shutter speed, however, it is generally said that the image pick-up at the shutter seed of 1/focal length (second) can fairly inhibit an occurrence of the camera shake.

When the first and second exposure times are changed according to the focal length of the image lens, camera shake can be easily inhibited. It is generally said that $1/125$ seconds can prevent the object's motion-blur, however, when the focal length of the lens is long and the shutter speed is less than a predetermined speed, the camera shake can be unintentionally generated. Thus, when the exposure time is changed according to the focal length for inhibiting the camera shake to be generated, it becomes easier to pick up the motionless image by the first image sensor and obtain the image having the slow synchronized flash effect.

Further, the image pick-up apparatus according to the first aspect is preferably provided with a synchronization timing input device for selecting a relationship of the first and second exposure times from among at least three synchronization timings including: an early act sync in which exposure starting timings substantially coincide; a middle sync in which middle times of the first and second exposure times substantially coincide, and a later act sync in which exposure ending timings substantially coincide, and the exposure condition setting device sets timings of exposure in each of the first and second image sensors based on the relationship selected by the synchronization timing input device.

The three relationships are each referred to as an early act sync, a middle sync, and a later act sync. The synchronization timing sets these relationships. However, the relationships are not limited to the three, and may be timings that are meticulously set by relationships between the early act sync and the middle sync, an early phase non-continuous sync in which the first exposure time ends before the second exposure time starts, and conversely a late phase non-continuous sync in which the first exposure time starts after the second exposure time ends.

When the synchronization timing input device for setting the relationships between the first and second exposure times is provided, the synchronization timing can be easily set to obtain the desirable relationship such as the early act sync, the middle sync, and the later act sync.

A method for setting the synchronization timing may be performed only by setting with an input switch. However, it is preferred that an image display unit displaying various types of schematic pictures or graphics representing slow synchronized flash effects is further provided so that one picture or graphic is selected from them for setting. Or, not only selecting pictures or graphics, but also selecting scales or only a letter may be adopted. In order to realize the synchronization timing selected here, the exposure timing of the first exposure time control device can be set by the exposure condition setting device.

In this case, the image pick-up apparatus is provided with the image display unit for displaying various types of pictures or graphics representing slow synchronized flash effects and one picture or graphic is selected from the displayed pictures or graphics by the synchronization timing input device. Since a user can easily imagine a completed image from the pictures and graphics, the user can easily set the timing so as to obtain an intended image. Selecting a position of the motionless image by the scale or selecting only by characters may be adopted, both of which enable the user to easily set the desired image.

Further, each of the first and second exposure time control devices may be a mechanical shutter or an electronic shutter, or both of them. When the mechanical shutters are used, the shutter can be open and closed arbitrarily. However, when the electronic shutters are used, it is necessary to provide the first and second pick-up synchronization signal generation device for outputting the first and second pick-up synchronization signals in order to control driving each of the first and second image sensors.

Furthermore, the image pick-up apparatus according to the first aspect is preferably further provided with a light amount adjustment device between the light dispersing device and at least one image sensor of the first and second image sensors, on the light path of the image light, the light amount adjustment device adjusting light amounts of each light entering the first and second image sensors. Any device such as an ND filter that can decrease the light amount may work well as the light amount adjustment device.

When the light amount adjustment device is provided between the image sensor and the light dispersing device on the light path of the image light, for example, even if the image sensors have different shutter speeds, the light amount of the image sensor having the slower shutter speed can be decreased so that the image picked-up at the slower shutter speed becomes has the same exposure as that of the image picked-up at the faster shutter speed. Thus, when the images are combined, the synthesized image has no discomfort.

Here, the light dispersing device is a device which a beam disperses image light such as a beam splitter. The light dispersing device may disperse light so that the exposure amounts of the first and second image sensors become equal. Or, the light dispersing device may disperse the light at a predetermined ratio so that the amount of incident light of the first image sensor is more than that of the second image sensor.

If the light dispersing device disperses the light at a predetermined ratio so that the amount of the light entered the first image sensor is more than the amount of the light entered the second image sensor, the relationships between the shutter speeds and the dispersion ratio can be optimized so that two image sensors can have the same exposure without providing the light amount adjustment device.

Further, the image pick-up apparatus according to the first aspect is preferably further provided with a sensitivity adjustment device for independently adjusting a gain of the first image signal output from the first image sensor and a gain of the second image signal output from the second image sensor.

When the sensitivity adjustment device for independently adjusting the gain of the first image signal output from the first image sensor and the gain of the second image signal output from the second image sensor, the gain of each image signal can be appropriately adjusted to obtain the image having an appropriate slow synchronized flash effect without using the flash. Further, the shading ratio between the motionless image and the image having motion-blur can be arbitrarily changed.

Furthermore, the image pick-up apparatus according to the first aspect is more preferably further provided with a predetermined table for setting the first and second exposure conditions including at least the first and second exposure times according to the brightness of the object, and the exposure condition setting device sets the first and second exposure conditions based on the brightness of the object photometered by the photometer device and the predetermined table. The predetermined table previously sets the relationships of the shutter speed, aperture, and the ISO sensitivity with respect to the brightness of the object.

If the predetermined table is provided and the exposure condition setting device sets the exposure conditions of the first and second image sensors based on the brightness of the object and the predetermined table, even a user having a little experience can pick up an appropriately exposed image having the slow synchronized flash effect.

The image pick-up apparatus according to the first aspect is preferably further provided with a shading setting device for setting a shading of at least one of the first and second image signals or a shading ratio thereof so as to set the first and second exposure times according to the set shading or the set shading ratio, or to change a synthesis ratio at which the first and second image signals are combined. The shading setting device may adopt a bar graph, a scale, or only letters to select shading similarly to the synchronization timing setting device.

Accordingly, when the shading setting device for setting the shading of the first and second image signals is provided, the shading ratio between the motionless image and the motion-blurred image can be arbitrarily changed by setting the exposure conditions of the first and second image sensors according to the set shading, or by changing the synthesis ratio for combining the first and second image signals.

The image pick-up apparatus according to the first aspect, is preferably further provided with a motion-blur effect setting device for setting a size of motion-blur of the moving object, and the second exposure time is preferably changed according to the size of the motion-blur set by the motion-blur effect setting device. Like the synchronization timing input device, the motion-blur effect setting device can be preferably provided with an image display device so that the user can select an intended size of the motion-blur according to pictures and graphics representing a size of the motion-blur displayed on the image display device. However, any other kinds of way such as bar graph, the scale, and characters may be used for setting the size of the motion-blur. Or, without the image display device, only buttons may be used for setting. The size of motion-blur of the moving object varies depending not only on the shutter speed but also on the moving speed of the object. The size of the motion-blur set by the motion-blur effect setting device is that caused by the shutter speed. Since an object moves at various speeds, although the size of the motion-blur is selected from, for example, schematic pictures described above, the motion-blur does not always be set to the size indicated by the schematic picture. Here, the selection of the size is like selecting the size from large, middle, or small.

When the second exposure time can be changed according to the size of the motion-blur set by the motion-blur effect setting device, even a user who does not understand the relationships between the exposure time and an motion-blur amount can photograph an intended image by easily and intuitively setting the desired size of the motion-blur. Further, even when the moving speed of the object changes, the motion-blur amount can be adjusted to become closer to the image.

According to a second aspect of the present invention, an image pick-up method includes: dispersing image light entered from an object via an image lens and causing each of a first and a second image sensors to form an image; photometering brightness of the object; setting each exposure condition including exposure times of the first and second image sensors based on the photometered brightness of the object, and setting a first exposure time when motion-blur of a moving object is not generated and a second exposure time when the motion-blur is generated; controlling exposure of the first and second sensors based on the set first and second exposure times set when an image is picked up; and synthesizing an image having a slow synchronized flash effect based on a first and a second image signals output from the first and second image sensors after the image is picked up.

The image pick-up method according to the second aspect is applied for dispersing an image light from the object and picking up an image by a first and a second image sensors. In the method, a first exposure time when motion-blur of a moving object is not generated and a second exposure time when the motion-blur is generated are set and exposures of the first and second image sensors are controlled so that the set exposure times are adopted and obtained a first and a second image signals output form the first and second image sensors are combined to synthesize an image. Thus, without using a flash, an image having slow synchronized flash effect in which a motionless image and a dynamic image having motion-blur are combined can be easily picked up.

The image pick-up method according to the second aspect preferably includes: setting a shading of at least one of the first and second image signals and a shading ratio thereof; and setting the first and second exposure times so that the set shading or the shading ratio are adopted.

In the image pick-up method according to the second aspect, the shading setting device sets a shading (density) of the first and second image signals and changes the exposure condition of the first and second image sensors to acquire the set shadings. Thus, the shadings of the image having the motion-blur and the image having no motion-blur, can be set according to the user's desire. Accordingly, a user can pick up an image having the more versatile slow synchronized flash effect.

In addition, the image pick-up method according to the second aspect preferably further includes: setting a shading at least one of the first and second image signals or a shading ratio thereof; and changing the shading ratio of the first and second image signals in the image synthesis according to the set shading or the shading ratio.

Accordingly, a shading of at least one of the first and second image signals or the shading ratio thereof can be set, and the shading ratio between the first and second image signals in the image synthesis can be changed according to the set shading and the shading ratio. Thus, the image having the slow synchronized flash effect desired by the user can be picked up.

Further, the image pick-up method according to the second aspect preferably further includes: setting a size of motion-blur of the moving object; and changing the second exposure time according to the set size of the motion-blur.

Accordingly, the size of the motion-blur of the moving object can be set, and the second exposure time can be changed according to the set size of the motion-blur. Thus, the desired size of the motion-blur can be easily set.

Further, a recording medium on which a program is recorded, the program causing a processor to control an image pick-up device so that the image pick-up device can implement the image pick-up method mentioned above can also achieve the aim of the present invention.

BRIEF DESCRIPTION OF THE DRAWINGS

FIG. 4 is a rear face view of a camera provided with one embodiment of the synchronization timing input device using the image display device;

FIG. 6 is a diagram illustrating a timing for realizing an early act sync using an pick-up synchronization signal;

FIG. 12 is a diagram illustrating a first example of a table setting an exposure condition of an image sensor based on brightness of a photometered object;

FIG. 15 is a diagram illustrating a second example of a table setting the exposure condition based on brightness;

FIG. 18 is a diagram illustrating a third example of a table for changing the exposure condition according to the shading setting;

FIG. 20 is a diagram illustrating a fourth example of a table for changing luminance of an image signal according to the shading setting;

FIG. 23 is a diagram illustrating a fifth example of a table for changing a shutter speed according to a motion-blur effect setting; and FIG. 24 is a diagram illustrating a sixth example of a table for changing the shutter speed according to the motion-blur effect setting.

DETAILED DESCRIPTION OF THE PREFERRED EMBODIMENTS

Referring to the figures, the embodiments for implementing the present invention will be described as follows.

Figure 1:
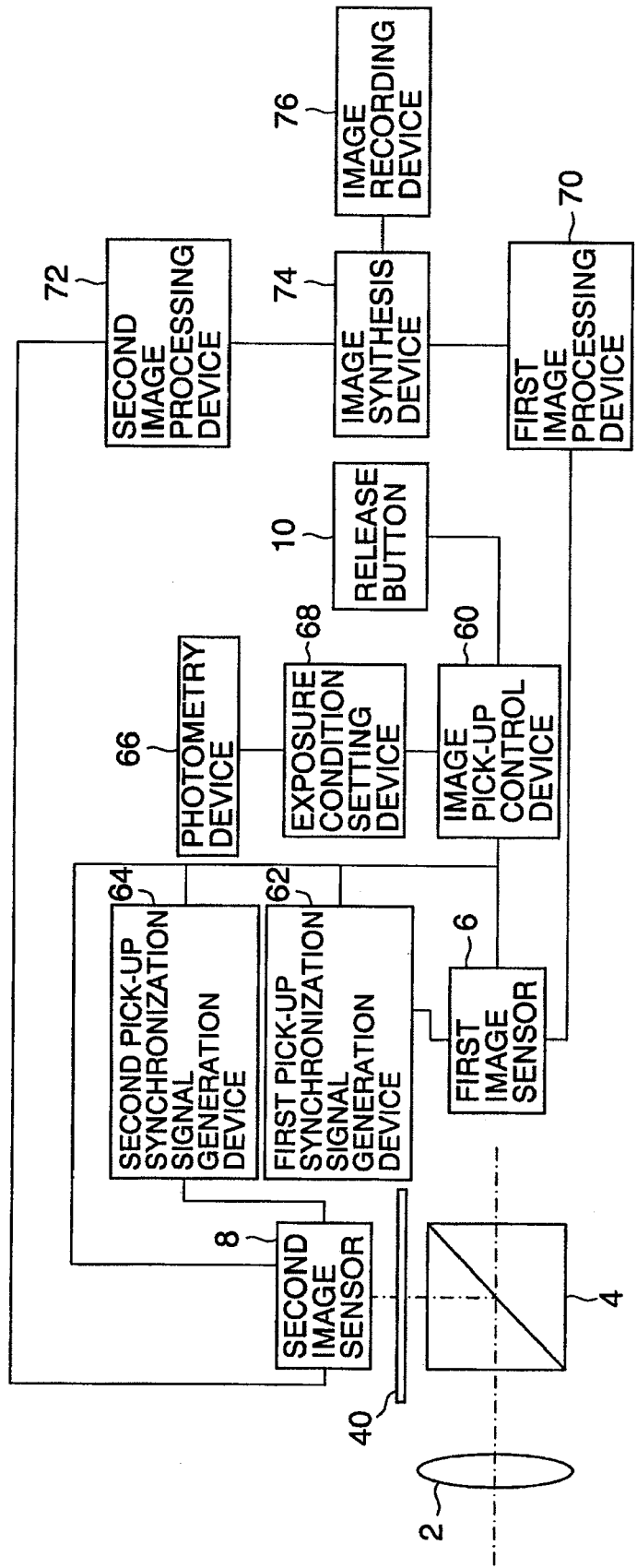
FIG. 1 is block diagram illustrating a first embodiment of an image pick-up apparatus according to the present invention.

FIG. 1 is a block diagram illustrating a first embodiment of the image pick-up apparatus according to the present invention. The image pick-up apparatus includes a lens 2 on a light path of an image light, a beam splitter 4 that is a light dispersing device, and a first image sensor 6, and further includes second image sensor 8 located at a position where the incident light is forwarded after being dispersed by the beam splitter 4.

Pulses for cleaning unnecessary charges stored in the first image sensor 6 and the second image sensor 8 and shutter gate pulses synchronized to an pick-up synchronization signal for reading out the accumulated charges can be, independently and respectively, added to the first image sensor 6 and the second image sensor 8 from a first pick-up synchronization signal generation device 62 and a second pick-up synchronization signal generation device 64 controlled by an image pick-up control device 60. The time period from the pulse for cleaning the unnecessary charges to the shutter gate pulse is controlled so that the first and second charge accumulation times (so-called the first and second shutter speeds by the first and second electronic shutters) of the signal charges accumulated in the first image sensor 6 and the second image sensor 8 are each controlled.

Exposure control including control of the first and second shutter speeds by the first and second electronic shutters are performed based on a photometry device 66 for photometering the brightness of the object and an exposure condition setting device 68 for setting the exposure condition of the first image sensor 6 and second image sensor 8. The photometry device 66 may be an external photometering device, or an internal photometering device for photometering the brightness of the object based on the image signal. The details for setting the exposure condition by the exposure condition setting device 68 will be described below.

The signal charges each accumulated in the first image sensor 6 and the second image sensor 8 as described above are sequentially read out as voltage signals (image signals) by the reading out pulses. The first image signal read out from the first image sensor 6 is output to a first image processing device 70 and the second image signal read out from the second image sensor 8 is output a second image processing device 72.

A release button 10 that is a two-step stroke button includes a switch S1 for causing AF and AE to prepare for the image pick-up when half pressed to be turned on, and a switch S2 for taking in the image when fully pressed to be turned on. When the release button 10 is half pressed, the photometry device 66 photometers the brightness of the object, and the exposure condition setting device 68 sets the first exposure time when the motion-blur of the moving object is not generated and the second exposure time when the motion-blur is generated. When the release button 10 is fully pressed, the image pick-up control device 60 controls the first and second electronic shutters so that the first and second image signals obtained by exposing during the first and second exposure times that are set for the first image sensor 6 and second image sensor 8 are output. The image light entered form the object via the lens 2 is dispersed into two directions by the beam splitter 4. One of the dispersed light is straight forwarded o enter the first image sensor 6, the other light is reflected on the beam splitter to change the forwarding direction at 90 degrees and enters the second image sensor 8. When the image light enters, the first image sensor 6 and the second image sensor 8 photo-electrically convert the image light, and the shutter is clicked at the set timing to output the image signal. The first image signal output from the first image sensor 6 and the second image signal output from the second image sensor 8 are each transferred to the first image processing device 70 and the second image processing device 72, where the image processing is performed and an image synthesis device 74 combines the image signals to synthesize (generate) one image. An image recording device 76 stores the image.

The first image processing device 70 and the second image processing device 72 perform various kinds of image processing such as white balance compensation, gamma compensation and outline correction. Further, the second image processing device 72 performs the processing for converting a right-left reversed or upside down image into the non-reversed image by the beam splitter.

It is preferred that the exposure light amount of the first image sensor 6 and that of the second image sensor 8 are substantially equal, for example, when the brightness of the object is 11 EV, the exposure of the first image sensor 6 is set to 10 EV and that of the second image sensor 8 is set to 10 EV. The first shutter speed is set to ⅟125 seconds (TV7) and F 2.8 (AV 3), and the second shutter speed is set to ⅟15 seconds (TV 4), F 8 (AV 6) so that the image having appropriate exposure and appropriate slow synchronized flash effect at a synthesis ratio 1:1. According to the exposure condition set by the exposure condition setting 68 based on the brightness from the object, the image pick-up control device 60 controls the first and second electronic shutters and the aperture (not illustrated).

Since only one aperture is provided, the aperture is set to F 2.8 (AV 3) which is brighter. In order to set to the same exposure light amount as F 8 (AV6) which is smaller than F 2.8 (AV 3) by three steps, an ND filter 40 for decreasing the light amount between the beam splitter 4 and the second image sensor 8 is provided.

Here, an example is provided with two image sensor. However, in a case of three image sensors, the image light is dispersed into three by the beam splitter, and a third image sensor is provided in a direction in which the image light is reflected. Similarly to other image sensors, if a shutter and an image processing device corresponding to the third image sensor are provided, three images can be combined. For example, three image sensors are provided, the images each having large motion-blur, small motion-blur, and no motion-blur can also be combined. Further, in a similar manner, if four image sensors are provided, more various images can be combined.

The beam splitter is used for dispersing the image light at the ratio of 1:1, but may be used for dispersing the light at a predetermined ratio so that the incident light into the first image sensor 6 is more than that of the second image sensor 8. Regarding the predetermined ratio, it is preferred that the exposure light amount of the first image sensor 6 and second image sensor 8 is equal at the ratio from the relationships of each of the shutter speeds and the brightness of the object. In this case, the ND filter 40 served as the light amount adjustment device is not necessary.

Here, a case is described where the first and second shutters are the electronic shutters. However, instead of the electro shutter, the mechanical shutter may be provided. When the mechanical shutter is used, a first shutter driver and a second shutter driver for independently controlling the mechanical shutter are necessary. The first and second shutter drivers are each connected to the first and second mechanical shutters. The first shutter is provided between the first image sensor 6 and the beam splitter 4, and the second shutter is provided between the second image sensor 8 and the beam splitter 4. Further, when the mechanical shutters are provided, one pick-up synchronization signal generation device can be used in common instead of the two pick-up synchronization signal generation devices 62 and 64.

Figure 2:
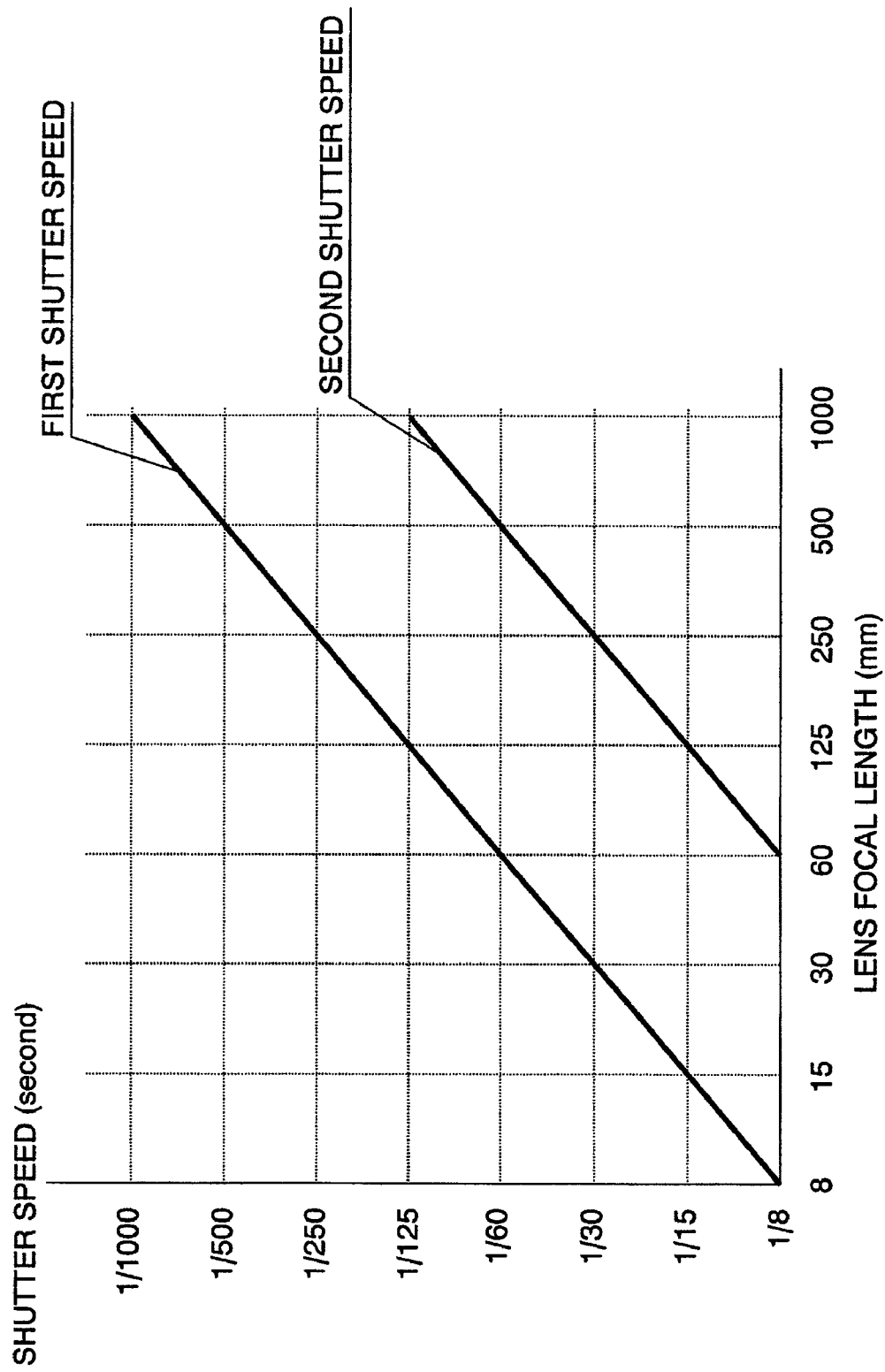
FIG. 2 is a graph illustrating relationships between a lens focal length and a first shutter speed or a second shutter speed.

FIG. 2 is a graph illustrating one example of relationships between the focal length of the lens and the first and second shutter speeds. Straight line representing the first shutter speed and that of the second shutter speed are parallel and spaced apart from each other by three steps of the shutter speed. Based on this graph, the shutter speed can be appropriately determined.

For example, in FIG. 2, when the focal length of the lens is set to 60 mm (corresponding 35 mm film equivalent), the first shutter speed is determined as 1/60 seconds and the second shutter speed is 1/8 seconds. In general, the limit shutter speed for generating the motion-blur depends on the focal length (corresponding value of 35 mm), and regulated to 1/focal length (second). Therefore, according to the first shutter speed in a graph illustrated in FIG. 2, even the moving object can be picked up so that the motion-blur is not generated. On the other hand, according to the second shutter speed, the moving object is picked up so that the motion-blur is generated for the image of the moving object.

When three image sensors and three shutters are provided, in a similar relationship to the graph, a straight line for the third shutter speed may be drawn with respect to the second shutter speed. When more sensors and shutters are provided, the similar arrangement may be performed.

Figure 3:
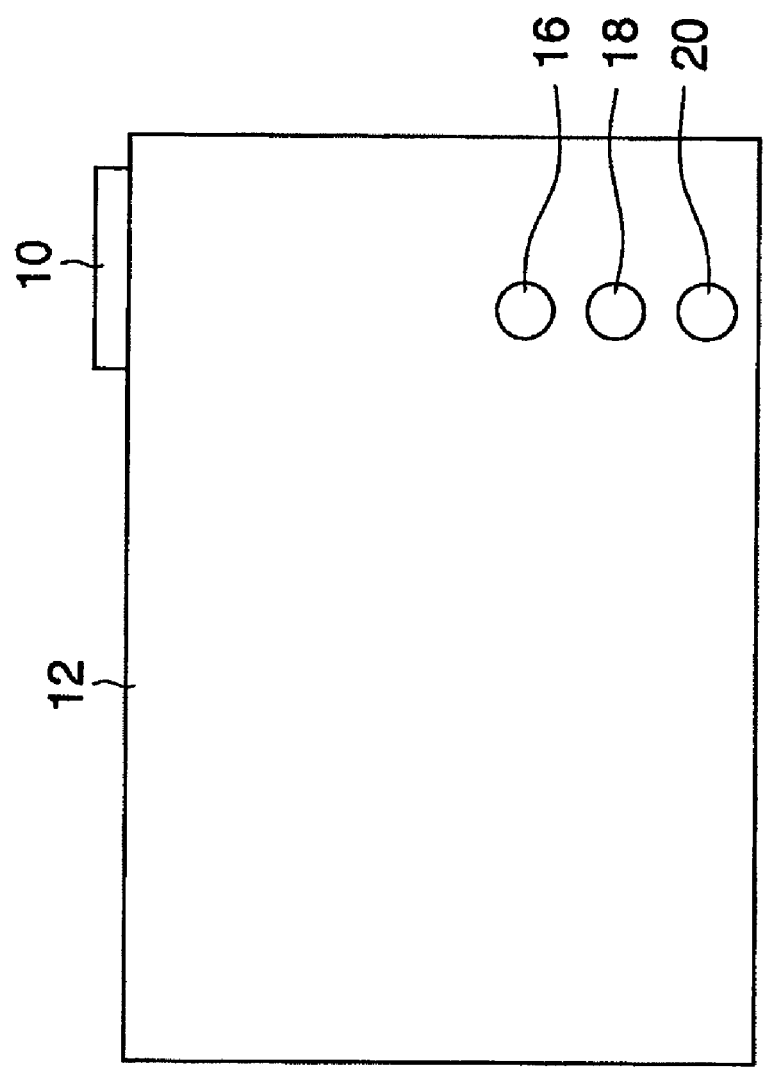
FIG. 3 is a rear face view of a camera provided with one embodiment of a synchronization timing input device.

FIG. 3 is a diagram illustrating one example of a synchronization timing input device. A digital camera includes a front curtain button 16, a middle button 18, and a rear curtain button 20 on the rear face portion 12 thereof. The use can set the synchronization timing only by pressing the button of the synchronization. Here, only three types of timings can be set, however, a number of the buttons may be increased so that a midway between the front curtain and the middle and the timings such as the front side non-continuous synchronization and the late phase non-continuous synchronization can be set.

FIG. 4 is a diagram illustrating one example of the synchronization timing input device including the image display unit 14. On the image display unit 14 provided on the rear face portion 12 of the digital camera, seven squares 26 each having sides of about a 1/15 size of the image display unit in a longitudinal direction are aligned in a straight line shape at an interval that is equal to one side of the square. One of the aligned squares is colored to notify which square is selected. Below the squares, a rectangle 28 having a longitudinal direction in parallel to the straight line along which the squares 26 are aligned is displayed at a space. Below the rectangle 28, an arrow in a parallel direction to the longitudinal direction of the rectangular pointing the right side in the diagram is displayed. At the end pointed by the arrow, "TIME" is displayed. The rectangular represents a slow shutter period, and the arrow represents the passing time. A length of longer side of the rectangle 28 that represents the slow shutter period that is about as nine times long as one side of the square 26. Counted from the left of the diagram, a left side of the second square is located on a same line as a shorter side of the rectangular. The other shorter side of the rectangular is located on the same line as the right side of a sixth square counted from the left in the diagram. Further, on a portion that is not image display unit on the rear face of the camera, a button 22 for instructing a direction and a set button 24 are provided. The direction button 22 can sequentially change positions of the colored square. The position of the colored square indicates the timing of the motionless image. For example, when the colored square is located at the second from left in the diagram, it indicates the early act sync, when at the center position, it indicates the middle sync, and when the second from right in the diagram, it indicates the later act sync. And when most right, it indicates the late phase non-continuous sync. The colored square is placed at a desired position and a driving timing of the first shutter is set when the lens 24 is pressed. This example describes seven squares, however, more than seven squares may be used. According to the increasing number of the squares, the settings can be more meticulously performed.

Figure 5A:
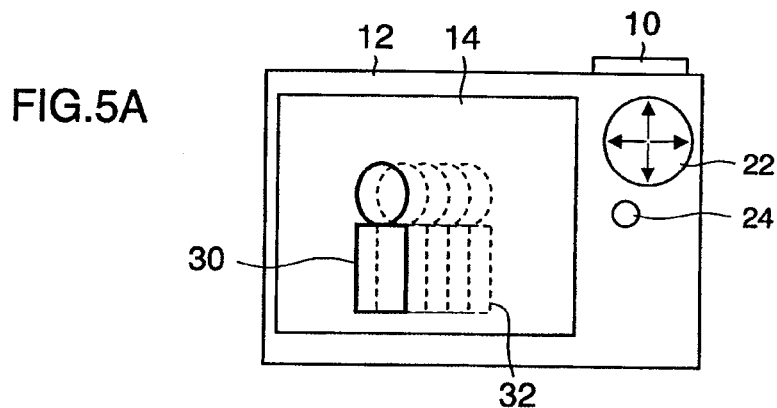
FIGS. 5A to 5D are rear face views of a camera provided with another embodiment of the synchronized timing input device using an image display device.
Figure 5B:
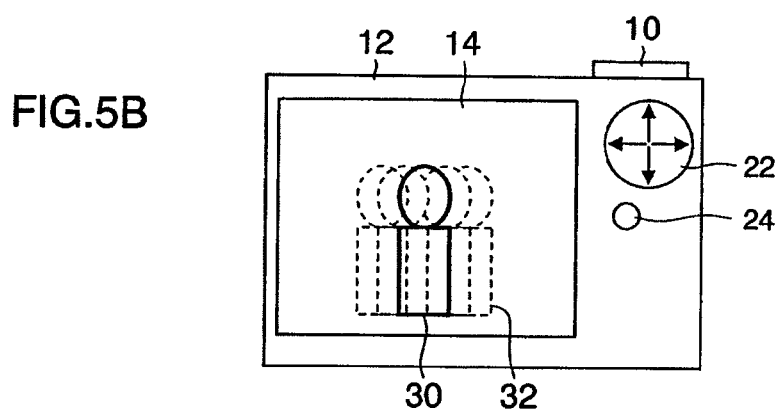
Figure 5C:
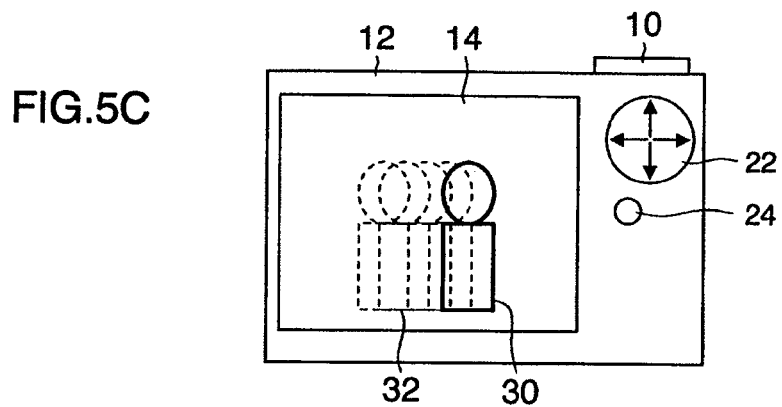

FIGS. 5A to 5C are diagrams illustrating another example of the synchronization timing input device provided with the image display unit. On the image display unit 14 provided on the rear face portion 12 of the digital camera, one picture 30 representing a person with a head and body is drawn with solid lines, and similarly a plurality of pictures 32 of a person are drawn with dotted lines and horizontally shifted from each other at a equal space. The button 22 for indicating a direction is pressed right or left so that the picture 30 of the solid lines can be moved. A position where the picture 30 of the solid lines indicates a position of the motionless image, and the picture 32 of the dotted lines indicates the position of the motion-blurred image.

Figure 5D:
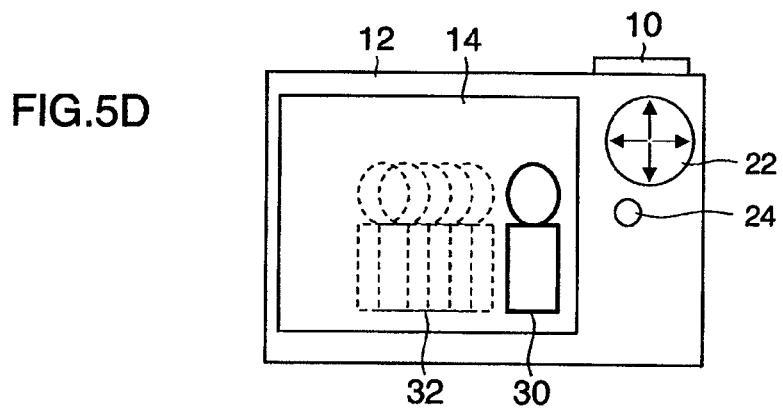

When the lens 24 is pressed after the position of the picture 30 of the solid lines is determined, the synchronization timing is set so that the motionless image is picked up at the position of the picture 30 of the solid lines. For example, as illustrated in FIG. 5A, when the picture 30 of the solid lines is set at a position of a left end of the picture 32 of the dotted lines in the diagram, the early act sync is indicated. When set at a position of a center of the pictures 30 of the dotted line as illustrated in FIG. 5B, the middle sync is indicated. As illustrated in FIG. 5C, when set at a position of a right end of the pictures 30 of the dotted lines, the later act sync is indicated. Further, as illustrated in FIG. 5D, the picture 30 of the solid lines is set at a position apart from the right end of the picture 32 of the dotted lines, the late phase non-continuous sync is indicated. This illustrates that a position where the moving object is picked up as a motion-blurred image and a position where the object is picked up as a motionless image (non-motionblurred image) are not continuous, or the exposure times are not overlapped. Examples of the non-continuous are not limited to this position. More meticulous settings may be performed in a range apart from the position of the picture of the dotted lines. The more meticulously the settings can be performed, the more appropriately the non-continuous spaces desired by the user can be set. Similarly, the picture of the solid lines is set to a position further apart from the left end of the picture of the dotted lines, the front side non-continuous sync is indicated.

The image pick-up control device 60 controls driving of the first and second shutters so that the first and second shutters have the relationships set by the synchronization timing input device.

FIG. 6 is a diagram illustrating one example of a method for picking up images using electronic shutters with an exposure starting timings coinciding between the first image sensor 6 and the second image sensor 8, and for ending exposure with different exposure time for the first image sensor 6 and the second image sensor 8. Here, the first exposure time is set to $1/125$ seconds and the second exposure time is set to $1/15$ seconds. The exposure starting timings can be set in the same manner for other exposure times.

When only the electronic shutters are used for picked up images, since the exposure ending timing of the image sensor is determined by the pick-up synchronization signal, independent synchronization signal generation devices (the first pick-up synchronization signal generation device 62 and the second pick-up synchronization signal generation device 64) are necessary to set the different exposure ending times. When the release button 10 is pressed, the image pick-up control device 60 simultaneously causes the first image sensor 6 and second image sensor 8 to start the exposure and to end each exposure according to a start up timing of the pick-up synchronization signal that is a previously set as an exposure time. Here, when $1/125$ seconds has elapsed since the exposure was started, and when the rising edge of the first pick-up synchronization signal is input, the first image sensor 6 ends its exposure. When $1/15$ seconds has elapsed since the exposure was stared, and when the rising edge of the second pick-up synchronization signal is input, the second image sensor 8 ends its exposure.

As obviously understood from FIG. 6, the first and second pick-up synchronization signals are controlled so that phases of the pick-up synchronization signals are shifted from each other as much as the shutter speeds ($1/125$ seconds).

When only mechanical shutters are used, and when the release button 10 is pressed, the image pick-up control device 60 starts to drive the first and second shutter drivers, the shutter drivers simultaneously open the first and second shutters to start the exposure of the image elements. When $1/125$ seconds has elapsed since the shutter was opened, the image pick-up control device 60 drives the first shutter driver to close the first shutter. When $1/15$ seconds has elapsed since the shutter was opened, the image pick-up control device 60 drives to close the second shutter. Thus, when only the mechanical shutter is used, only one pick-up synchronization signal generation device may be provided.

Figure 7:
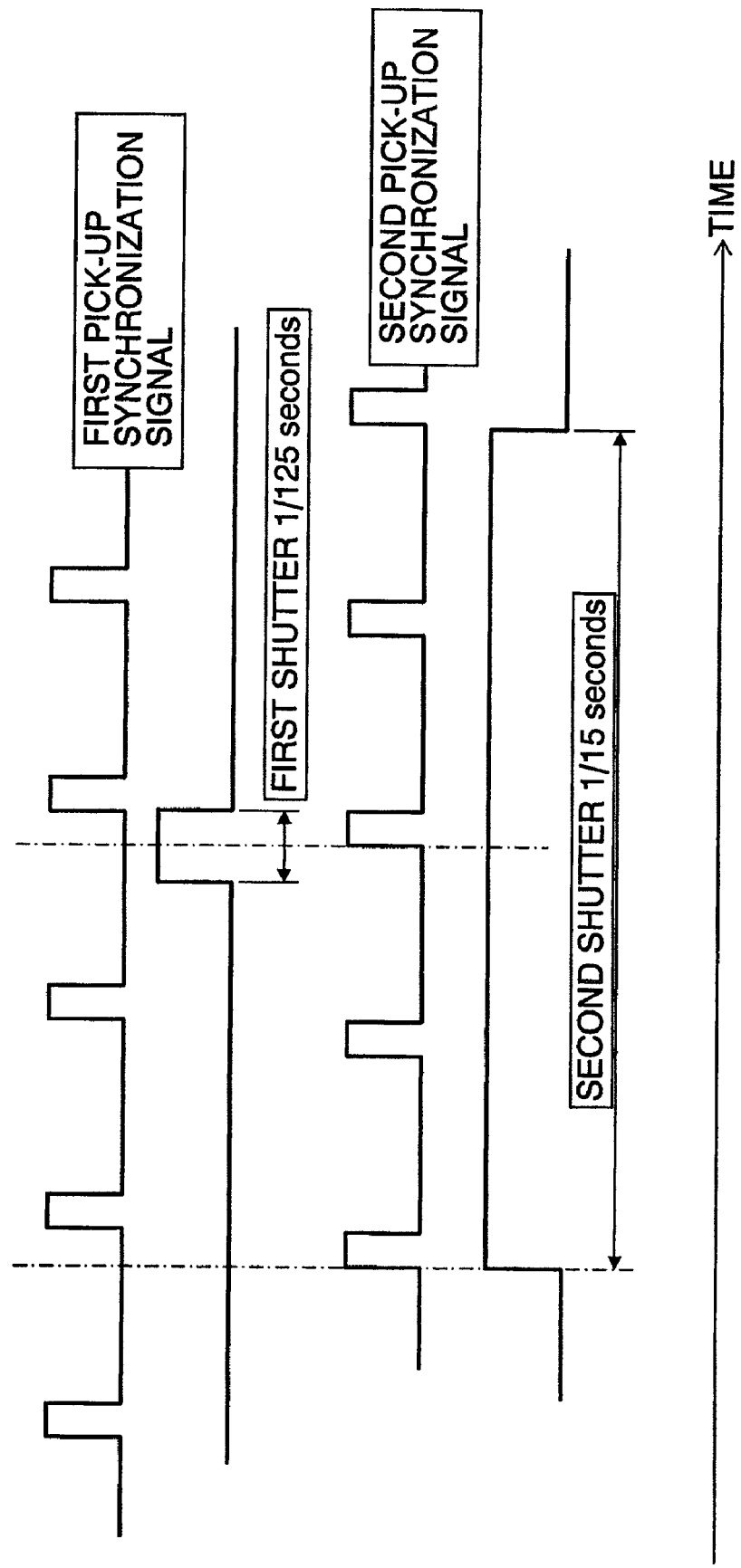
FIG. 7 a diagram illustrating a timing for realizing a middle sync using the pick-up synchronization signal.
Figure 8:
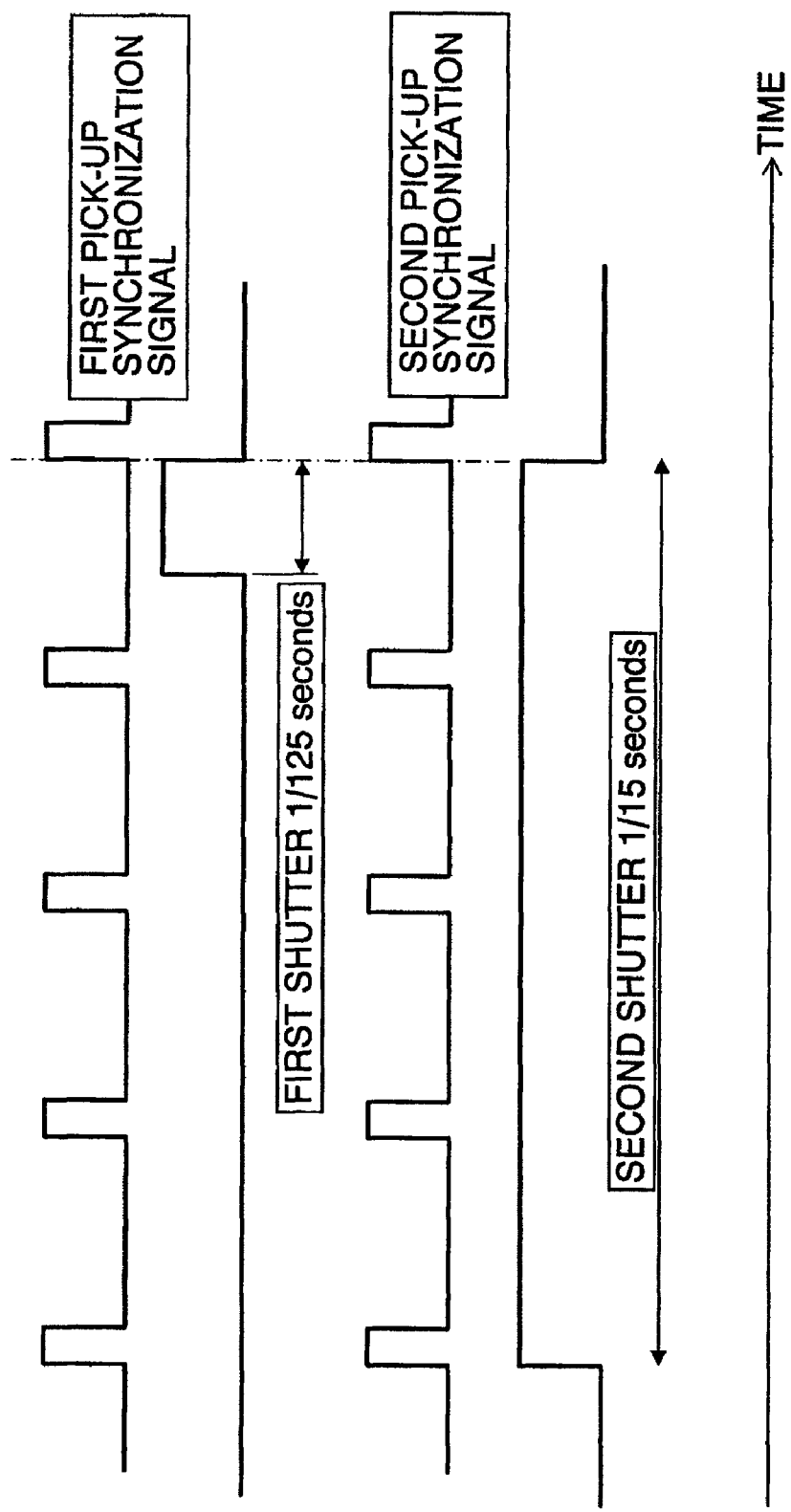
FIG. 8 is a diagram illustrating a timing for realizing a later act sync using the pick-up synchronization signal.
Figure 9:
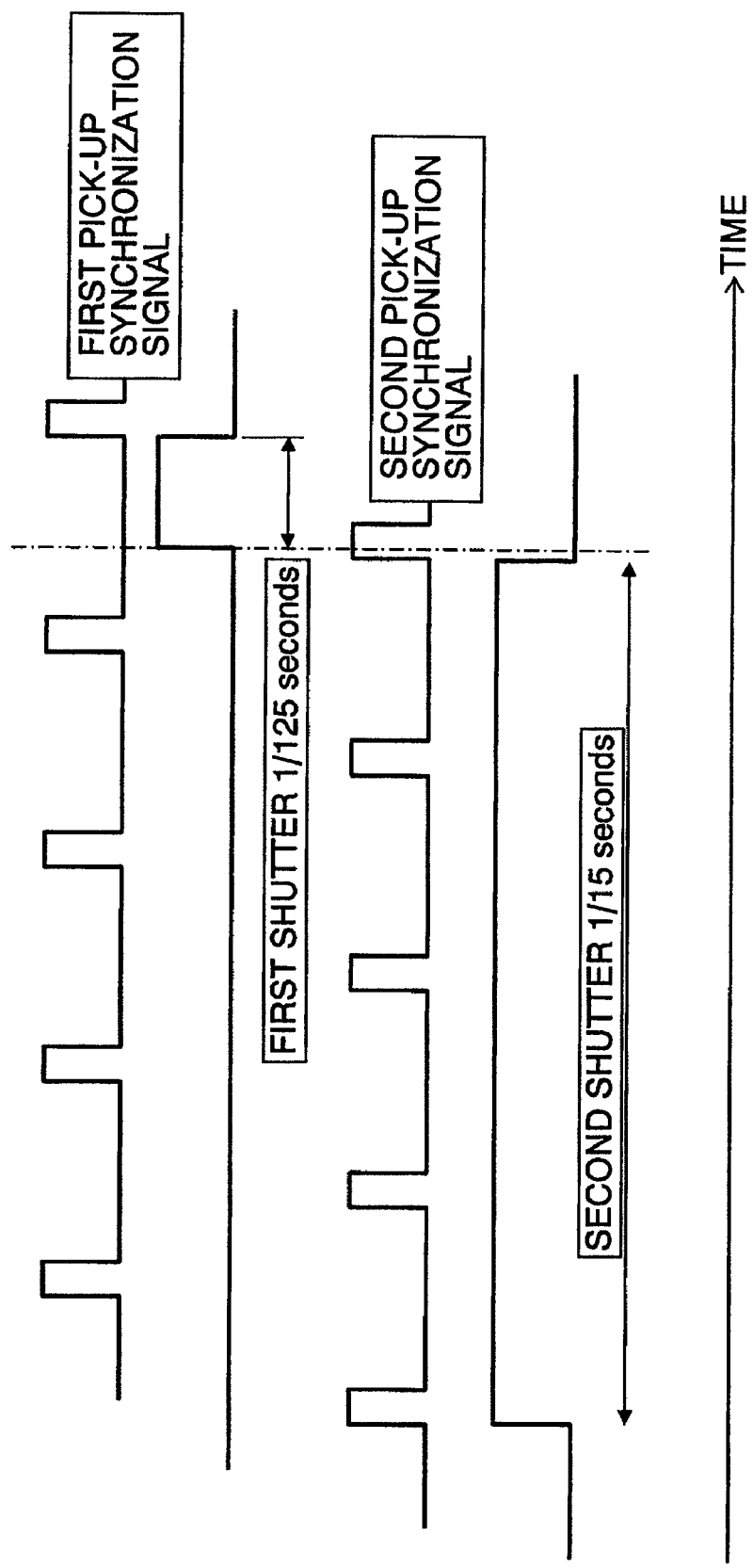
FIG. 9 is a diagram illustrating a timing for realizing a late phase non-continuous sync using the pick-up synchronization signal.

In this example and in other examples for obtaining the slow synchronized flash effect shown in FIGS. 7 to 9, the image pick-up control device 60 performs a calculation for determining a timing for opening the shutters based on the set exposure time and the phases of the first pick-up synchronization signal and the second pick-up synchronization signal, and so on. Based on a result of the calculation, the electronic shutters and the shutter drivers are driven.

As illustrated in FIG. 6, the exposure starting timings of the first image sensor 6 and the second image sensor 8 are set to coincide with each other to start the image pick-up. After the shutters are closed at different timing, the obtained images are combined to synthesize (generate) the image of the front curtain sync. As a result, an image has a moving object photographed at a motionless state at the back end of a motion-blurred portion where the moving object is photographed with motion-blur, is obtained.

FIG. 7 is a diagram illustrating one example of a method for picking up images using the electronic shutter with middle times of the exposure time coinciding between the first image sensor 6 and the second image sensor 8. Here, the case will be also described where the first exposure time is set to $1/125$ seconds and the second exposure time is set to $1/15$ seconds.

The phases of the pick-up synchronization signal for determining the timing for ending the exposure is adjusted so that the middle times of the exposure times are set to coincide with each other. When the release button 10 is pressed, the image pick-up control device 60 starts the exposure of the second image sensor 8. When $22/750$ seconds has elapsed, the exposure of the first image sensor 6 is started. When $1/125$ seconds has elapsed since the exposure of the first image sensor 6 was started, the first pick-up synchronization signal is started up and the exposure of the first image sensor 6 is ended. When $1/15$ seconds has elapsed since the exposure of the second image sensor 8 was started, and when the rising edge of the second pick-up synchronization signal is input, the exposure of the second image sensor 8 is ended.

If mechanical shutters only are used, when the release button is pressed, the image pick-up control device 60 drives the second shutter driver to open the second shutter. When $22/750$ seconds has elapsed after the second shutter is opened, the image pick-up control device 60 drives the shutter driver to close the first shutter. When $1/125$ seconds has elapsed since the second shutter was opened, the image pick-up control device 60 drives the second shutter driver to close the second shutter.

As described above, the middle times of the first and second exposure times are set to coincide with each other to pick up the image. The obtained images are combined to synthesize (generate) the image of the middle sync, which includes the motion-blurred portion of the moving object and the motionless image of the object at the center of the motion-blurred portion.

FIG. 8 is a diagram illustrating one example of a method for picking up images using electronic shutters with the exposure ending times coinciding between the first image sensor 6 and the second image sensor 8. Here, the first exposure time is also set to $1/125$ seconds and the second exposure time is set to $1/15$ seconds. In this example, the phases of the two pick-up synchronization signals are set to coincide with each other, for only this case, two or more image sensors may be driven using one pick-up synchronization signal.

When the release button is pressed, the image pick-up control device 60 starts the exposure of the second image sensor 8. When $22/375$ seconds has elapsed, the exposure of the first image sensor 6 is started. Sequentially, when $1/125$ seconds has elapsed, and when the rising edges of the two pick-up synchronization signals are input, the exposures of the two image sensors are simultaneously ended.

If the mechanical shutters only are used, when the release button 10 is pressed, the image pick-up control device 60 drives the second shutter driver to open the second shutter. When $22/375$ seconds has elapsed since the second shutter was opened, the image pick-up control device 60 drives the first shutter to open the first shutter. When $1/125$ seconds has elapsed since the first shutter was opened, the image pick-up control device 60 drives the first and second shutter drivers to simultaneously close the first and second shutters.

As described above, the exposure ending times of the first image sensor 6 and the second image sensor 8 are set to coincide with each other to pick up the image. The obtained images are combined to synthesize (generate) the image of the rear curtain sync. The image of the rear curtain sync including a moving object photographed at a motionless state at the front end of a motion-blurred portion where the moving object is photographed with motion-blur, is obtained.

FIG. 9 is a diagram illustrating one example of a method for picking up images using electronic shutters in which the exposure of the first image sensor 6 is started after the exposure of the second image sensor 8 is ended. Here, the first exposure time is also set to 1/125 second and the second exposure time is set to 1/15 seconds. A space from ending the exposure of the second image sensor 8 to starting the exposure of the first image sensor 6 is set similarly to an example of non-continuous sync as illustrated in FIG. 5D.

In order to appropriately set the first and second exposure times, the phase of the pick-up synchronization signal for determining the timing for ending the exposure is adjusted. When the release button 10 is pressed, the image pick-up control device 60 first starts the exposure of the second image sensor 8. When 1/15 seconds has elapsed, and when the rising edge of the second pick-up synchronization signal is input, the exposure of the second image sensor 8 is ended. When an appropriate time has elapsed since the exposure of the second image sensor 8 was ended, the exposure of the first image sensor 6 is started. When 1/125 seconds has elapsed since the exposure of the first image sensor 6 was started, when rising edge of the first pick-up synchronization signal is input, the exposure of the first image sensor 6 is ended. A period from the ending of the second exposure time to starting of the first exposure time is determined by the user depending on how much space between the motionless image of the moving object and the motion-blurred image is needed.

When only mechanical shutters are used, when the release button 10 is pressed, the image pick-up control device 60 drives the second shutter driver to open the second shutter. When 1/15 seconds has elapsed since the second shutter was opened, the image pick-up control device 60 drives the second shutter to close the second shutter. When a time determined by the user has elapsed since the second shutter is closed, the image pick-up control device 60 drives the shutter driver to open the first shutter. When 1/125 seconds has elapsed since the first shutter was opened, the image pick-up control device 60 drives the first shutter drive to close the first shutter.

As described above, after the exposure of the second image sensor 8 is ended, the first exposure is started to pick up the image, and the obtained images are combined to synthesize (generate) the image of the rear side non-continuous sync, which includes a moving object photographed at a motionless state at a position further apart from the front end of a motion-blurred portion where the moving object is photographed with motion-blur. In this image, the motion-blurred portion and the motionless portion are not continued to each other, and it is impossible for the normal slow synchronized flash to generate this type of the image.

Figure 10:
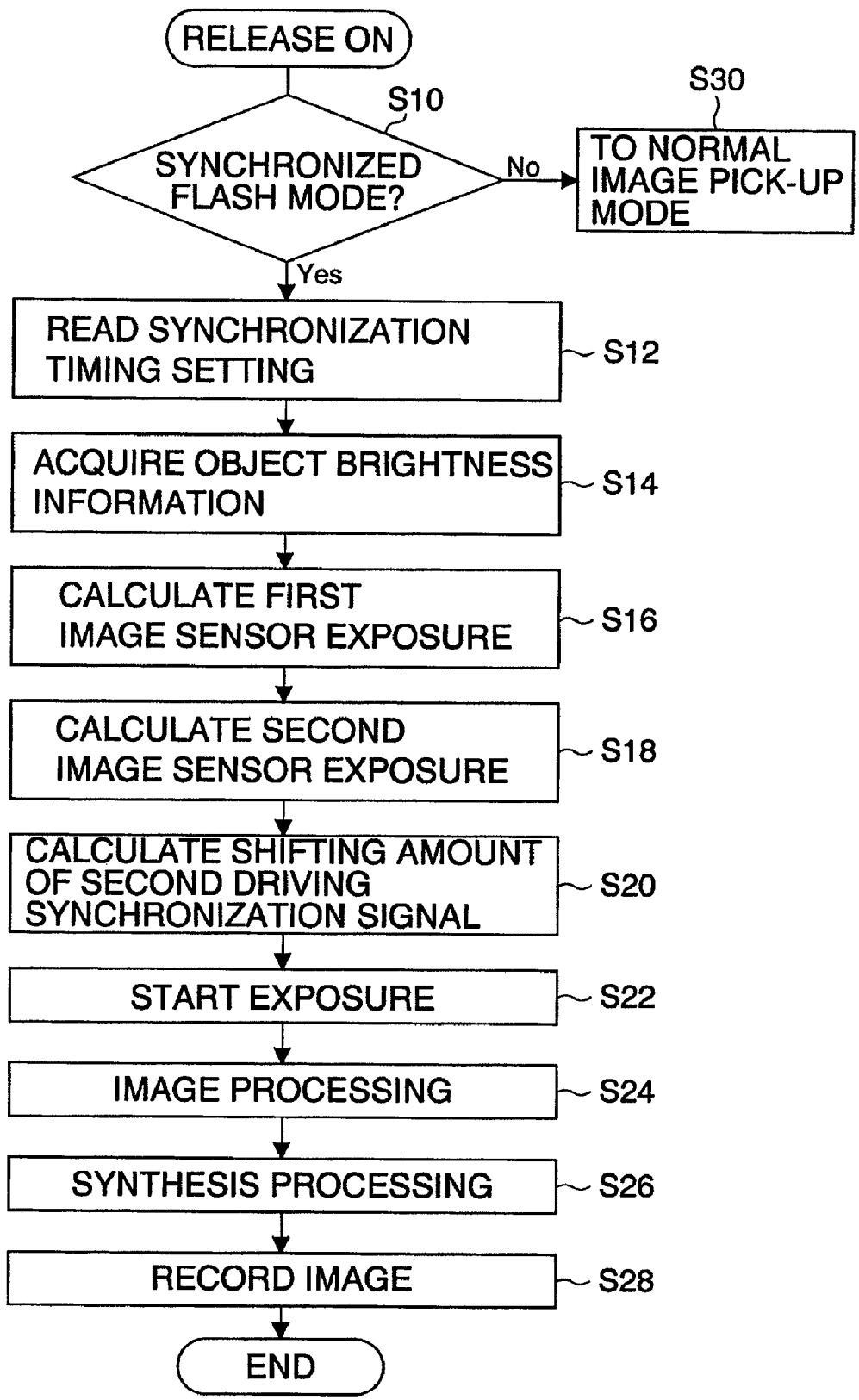
FIG. 10 is a flowchart illustrating a first embodiment of an image pick-up method according to the present invention.

FIG. 10 is a flowchart illustrating the first embodiment of the image method according to the present invention. In the image pick-up apparatus, when the release button 10 is pressed, it is first determined whether the synchronized flash mode is set (step S10). If the synchronized flash mode is set, the timing setting is read in via the synchronization timing input device illustrated in FIGS. 3 to 5D (step S12). The brightness of the object is determined by an automated exposure method that is performed in general (step S14). The exposures of the first image sensor 6 and the second image sensor 8 are operated from the brightness of the object (steps S16 and S18). A shifting amount of the second driving synchronization signal is operated according to the synchronized flash mode, and the exposure is started (steps S20 and S22). The more specific processing for the exposure has been described above. After ending picking-up the image, when the image processing of the obtained image signal and the synthesis processing are ended (steps S24 and S26), the synthesized image having the slow synchronized flash effect are recorded in the recording medium such as a memory card (step S28).

In step S10, it is determined that the synchronized flash mode is not set, the mode proceeds to a normal image mode for picking up the image (step S30). In the normal image mode, only the first image sensor 6 that does not include the ND filter 40 is used for picking up the image.

Figure 11:
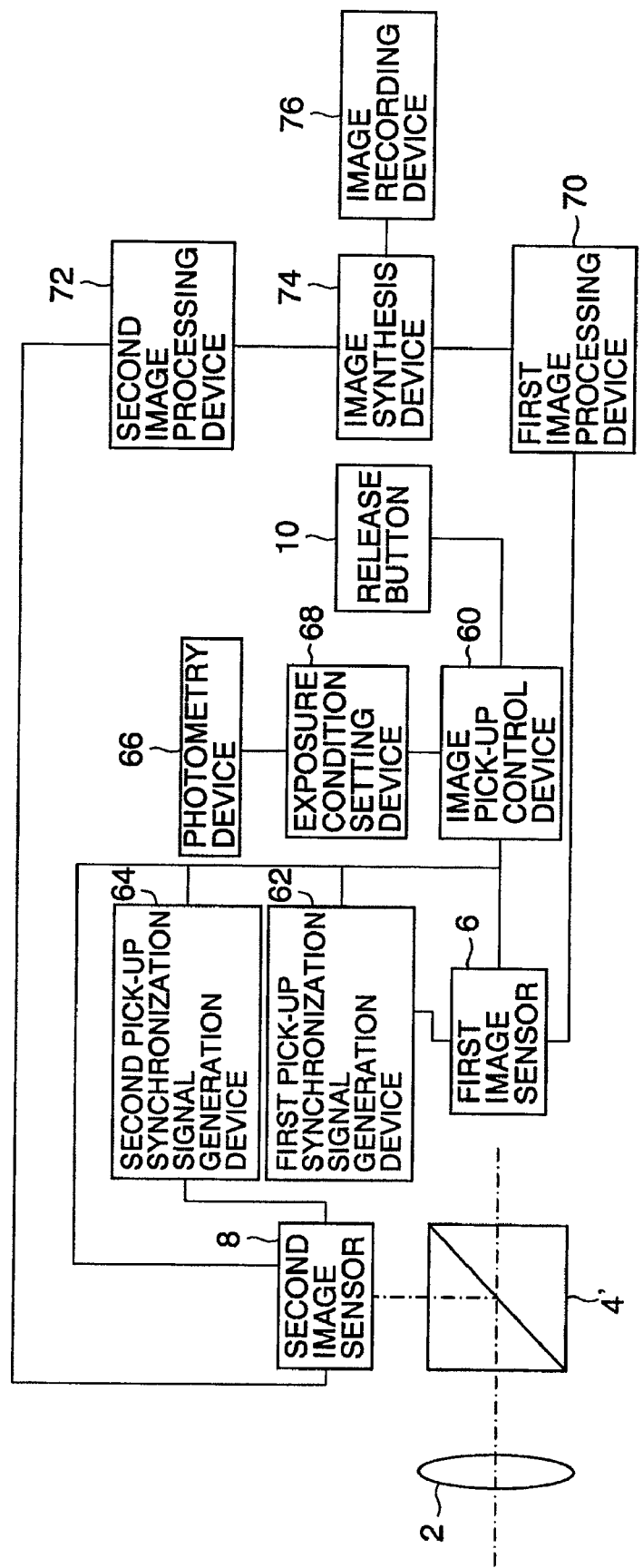
FIG. 11 is a block diagram illustrating a second embodiment of the image pick-up apparatus according to the present invention.

FIG. 11 is a block diagram illustrating the second embodiment of the image pick-up apparatus according to the present invention. The same numeral references are given to the parts similar to those in the first embodiment, and the details of the description will be omitted.

In the second embodiment as illustrated in FIG. 11, the ND filter 40 that is the light amount adjustment device is not provided between the beam splitter 4' and the second image sensor 8. The beam splitter 4' having a ratio of the amount of transmitting light and the amount of reflecting light of, for example, 8:1 is used.

Accordingly, even if the first shutter of the first image sensor 6 is set to eight times (exposure time is set to 1/8) the second shutter speed of the second image sensor 8, the same amount of exposure light can be obtained.

FIG. 12 illustrates a first example of a table for setting the exposure conditions of the first image sensor 6 and the second image sensor 8 based on photometered brightness of an object. The table illustrates relationships between the brightness of the object, and shutter speeds and apertures. As illustrated in the first embodiment in FIG. 1, the table illustrated here is applied for a case where the ND filter 40 is inserted between the beam splitter 4 and the second image sensor 8.

For example, when the brightness of the object is 9 EV, according to the FIG. 12 previously recorded in the exposure condition setting device 68, the exposure value 8 EV of the first image sensor 6 is determined to the shutter speed 1/125 seconds (7 Tv) and the aperture F1.4 (1 Av). The exposure value 8 EV of the second image sensor 8 is determined to the shutter speed 1/15 seconds (4 Tv) and the aperture F4 (4 Av (1 Av+ND for filter three steps)).

Figure 13:
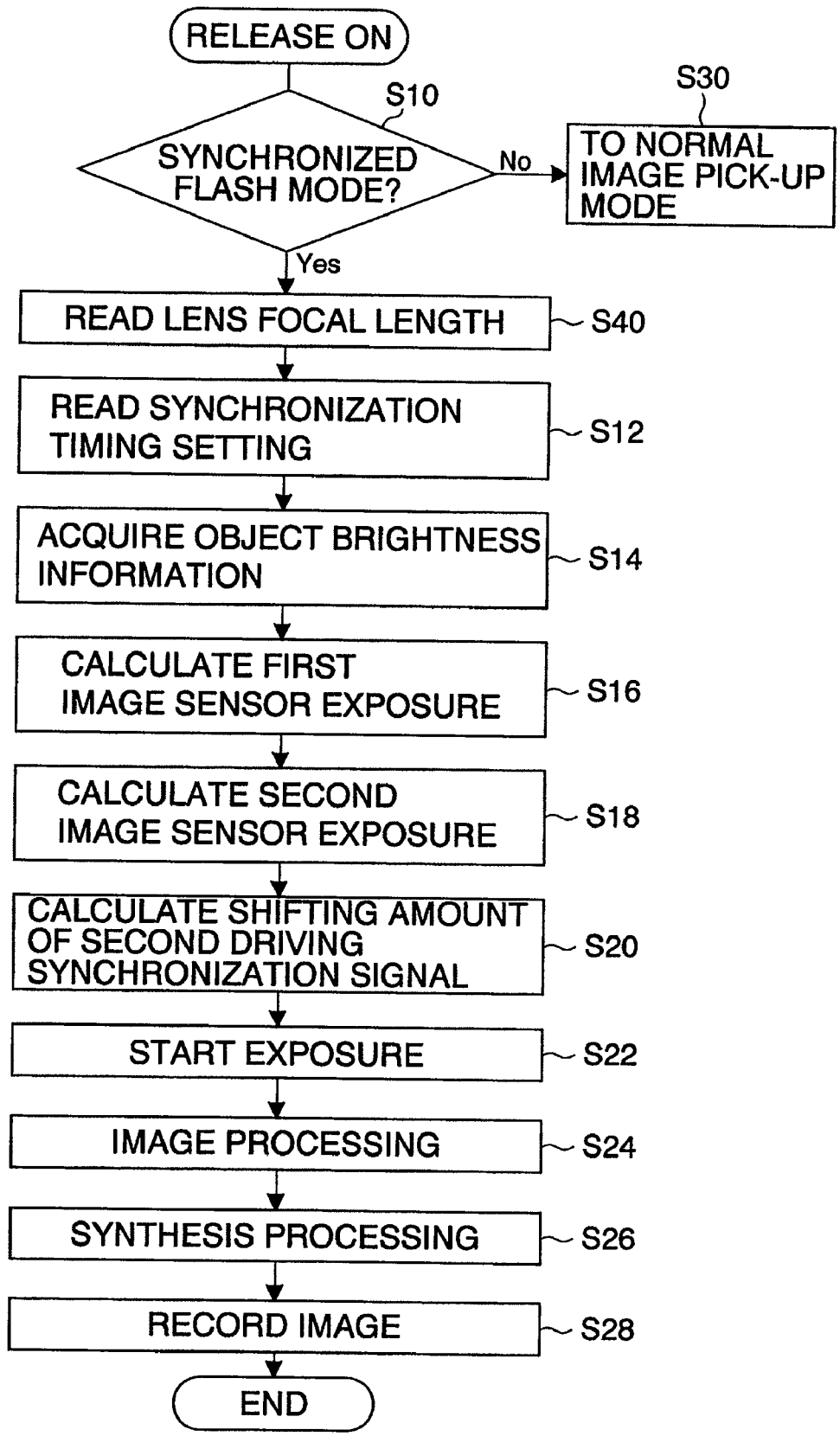
FIG. 13 is a flowchart illustrating a second embodiment of the image pick-up method according to the present invention.

FIG. 13 is a flowchart illustrating the second embodiment of the image pick-up method according to the present invention. In FIG. 13, the same step numerals are given to steps in common with that in the flowchart of the first embodiment illustrated in FIG. 10, and the details of the description will be omitted.

The difference between FIG. 13 and FIG. 10 is that a process for reading a lens focal length (step S40) after determining whether the mode is set is added. The lens focal length read in step S40 is used for determining the first and second shutter speeds as illustrated in FIG. 2.

Figure 14:
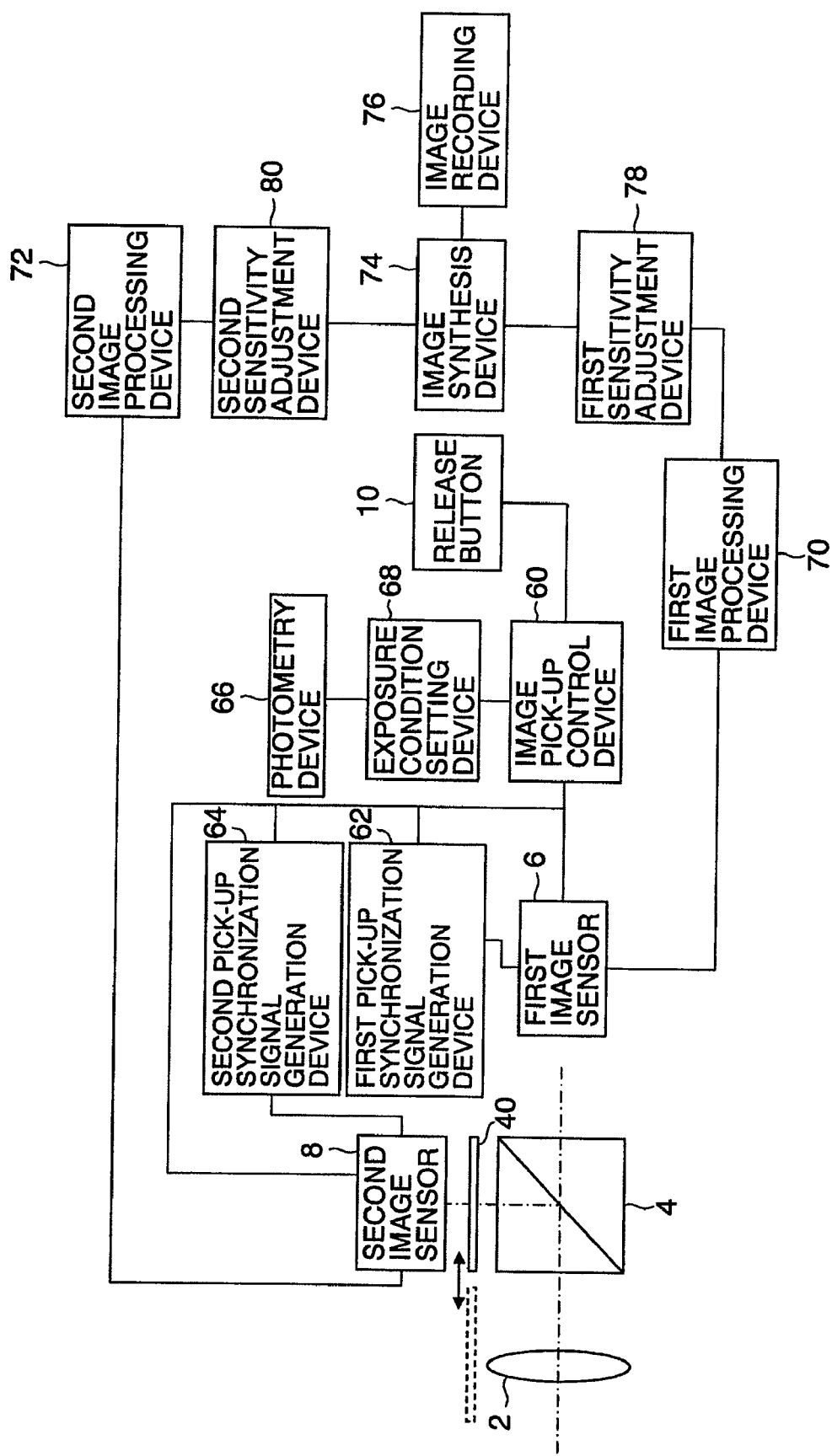
FIG. 14 is a block diagram illustrating a third embodiment of the image pick-up apparatus according to the present invention.

FIG. 14 is a block diagram illustrating a third embodiment of the image pick-up apparatus according to the present invention. The same numeral references are given to the parts in common with the block diagram in the first embodiment as illustrated in FIG. 1, and the details of the description will be omitted.

The difference between FIG. 14 and FIG. 1 is that FIG. 14 includes a first sensitivity adjustment device 78 and a second sensitivity adjustment device 80 for adjusting the ISO sensitivity of the first and second image signals output from the first image sensor 6 and the second image sensor 8. Further, the ND filter 40 can be inserted or retracted between the beam splitter 4 and the second image sensor 8.

FIG. 15 illustrates the second example of the table for setting the first and second exposure condition based on the photometered brightness of the object. The table illustrates relationships of the brightness of the object and the shutter speed, the aperture, and the ISO sensitivity.

The table of the first example illustrated in FIG. 12 is advantageous in that the easy storage can configure the table, however, it is difficult to ensure the image region for a dark object. In order to obtain the motionless image of even the dark object, it is necessary to use a lens having a bright aperture and to set the ISO sensitivity high. However, in general, if the ISO sensitivity is carelessly increased, the electric noise is generated to deteriorate the image quality. FIG. 15 is a table for obtaining the optimum slow synchronized flash effect at necessity minimum of the ISO sensitivity.

In FIG. 15, an example of 1 EV in which the object is most dark will be described. In this case, the ND filter 40 is retracted from between the beam splitter 4 and the second image sensor 8 (refer to FIG. 14).

Further, it is assumed that the focal length of the lens is recorded as 50 mm. The minimum shutter speed necessary for obtaining the motionless image is generally 1/50 seconds, now, supposing that the camera shake is inhibited at 1/60 seconds. Assuming that the lens opening F No. (F stop number) is 2.8, the ISO 100 does not necessarily indicate 0 EV that is the exposure value of the first image sensor 6. In order to achieve 0 EV in this darkness, since an open limit of the aperture is 3 Av, the shutter speed needs to be −3 TV, that is, 8 seconds to acquire the necessary light amount. However, under this condition, the desired motionless image can not be obtained. Here, the ISO sensitivity may be set to 9 Sv, that is, the ISO 51200 so that the target shutter speed is set to 1/60 seconds and the lens opening is set to 0 EV at F2.8. Further, the exposure value of the second image sensor 8 is set to a condition in which the shutter speed is slower by three steps with respect to the high speed shutter in order to pick up the motion-blurred image, the shutter speed 3 Tv (1/8) seconds is selected. The aperture is open 3 Av, and 6 Sv of the ISO 06400 is set to achieve 0 EV.

Since the embodiment has a configuration in which one lens includes a plurality of the image sensors, individual image sensor can not change the aperture. Here, the ND filter 40 for decreasing the transmissivity of only the second image sensor 8 is used. In FIG. 15, the first aperture and the second aperture have different values from the brightness of the object 8 EV. From the brightness 8 EV, the ND filter 40 is inserted into the second shutter unit. Or, without the ND filter 40, to realize the aperture value, a rate of the beam splitter for dispersing the light may be changed.

Figure 16:
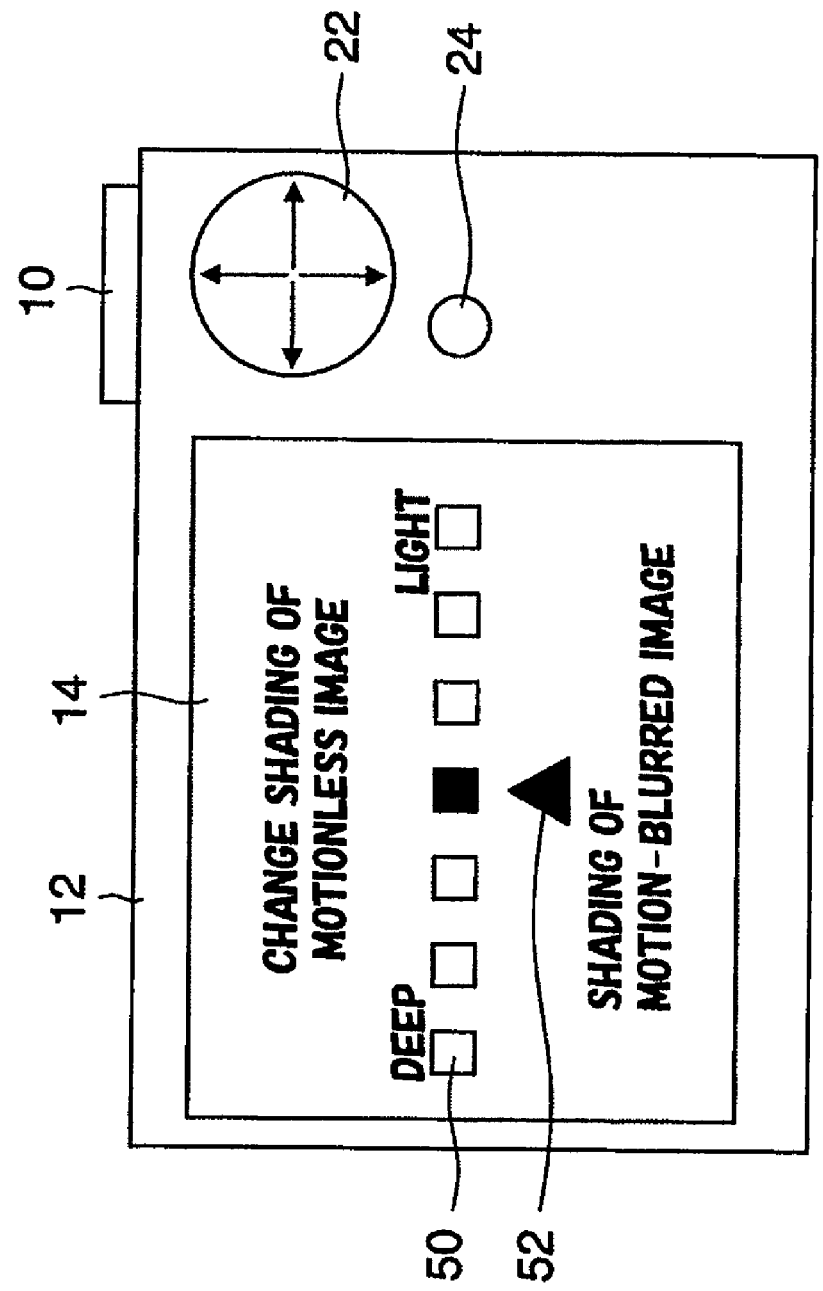
FIG. 16 is a rear face view of a camera provided with one embodiment of a shading setting device.

FIG. 16 illustrates an example of the shading setting device for setting the shading (density) of the motionless image and the motion-blurred image. On upper portion of the image display unit 14 provided on the rear face portion 12 of the digital camera, "set shading of motionless image" is displayed. At the center, seven squares 50 having 1/20 the size of the image display unit 14 in the longitudinal direction are displayed aligning in a straight line at the space having a length equal to one side of the square.

At a right end upper portion of the aligned squares, "light" is displayed, and at a left end upper portion, "deep" is displayed. Below the colored square, a triangle colored with the same color pointing one square is displayed at a space. Further, at a portion on a rear face that is not the image display unit 14, the direction button 22 for indicating a direction and a direction button 22 are provided. Pressing the direction button 22 right and left can sequentially change the position of the square. The square indicates the shading of the motionless image, and the position of the triangle indicates the shading of the motion-blurred image. The colored square indicates motionless image shading currently selected, and the relationships of the position of the square and the position which the triangle indicating the shading of the motion-blurred image is pointing is viewed. Thus, the relative shading is easily set.

FIG. 16 illustrates a case where the shading of the motionless image and that of the motion-blurred image are the same. For example, when the colored square is placed at the left end of the diagram and the triangle points the square at the right end of the diagram, the motionless image has the deepest shading and the motion-blurred image has the lightest shading. When the colored square is placed at the right end and the triangle points the square at the left end, the motionless image has the lightest shading and the motion-blurred image has the deepest shading. When the lens 24 is pressed with the colored square placed at the desired position, the shading of the motionless image and the motion-blurred image is set. This example describes seven squares, however, more squares may be used. According to the increasing number of scales, the more meticulous settings become possible. Similarly, the motionless image and the motion-blurred image in this example may be changed for a display.

The image pick-up control device 60 changes the exposure condition or and varies the brightness when the images are combined so that the shading set by the shading setting device is adopted.

Figure 17:
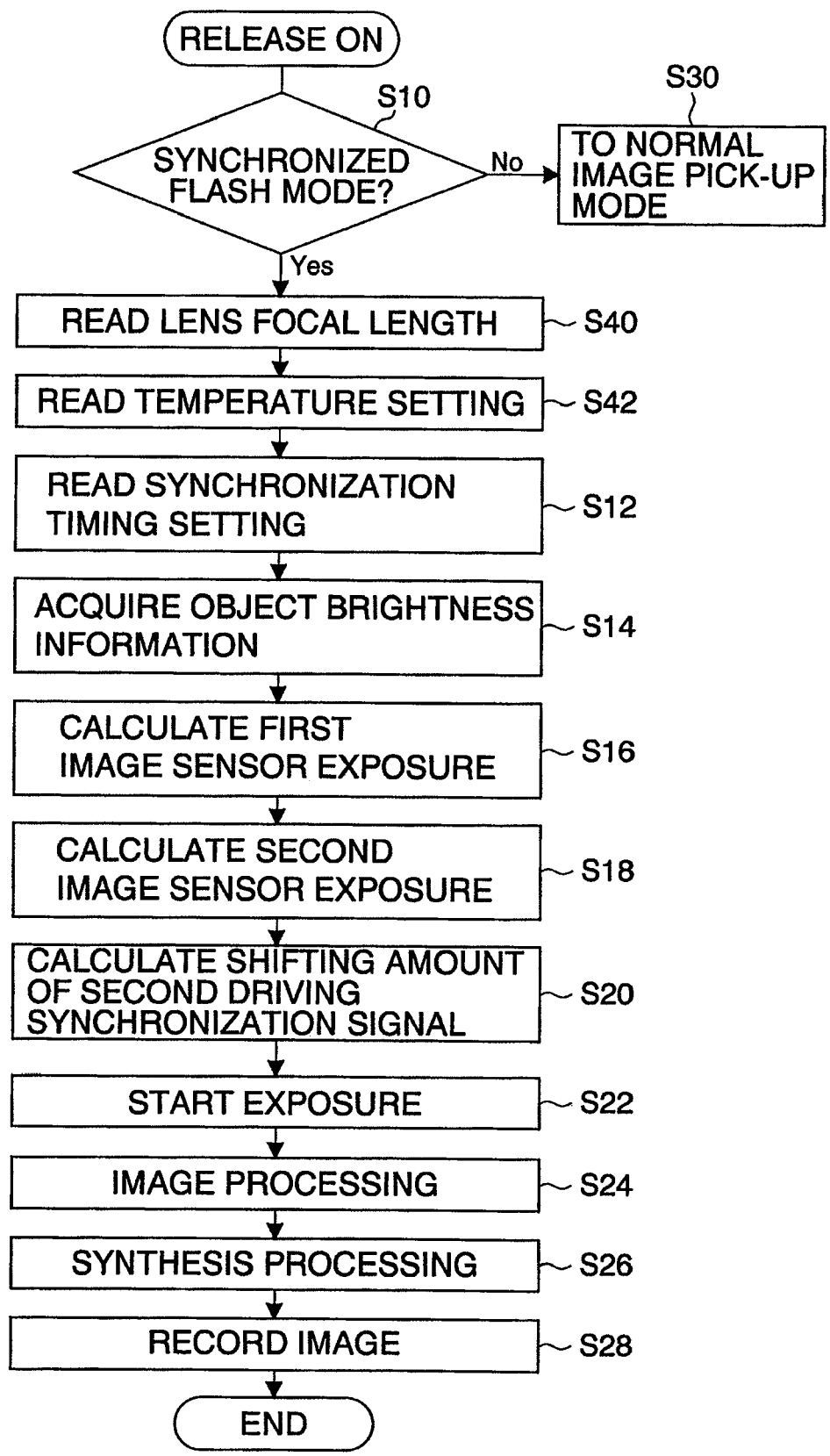
FIG. 17 is a flowchart illustrating a third embodiment of the image pick-up method according to the present invention.

FIG. 17 is a flowchart illustrating the third embodiment of the image pick-up method according to the present invention. In FIG. 17, the same step numerals are given to steps in common with the flowchart of the second embodiment illustrated in FIG. 13, and the details of the description will be omitted.

The difference between the FIG. 17 and FIG. 13 is that a process for reading the shading setting (step S42) is added after the process for reading the lens focal length (step S40) in FIG. 17. The shading of the motionless image read in step S42 is used as one of information for determining the first and second exposure conditions as illustrated in the table in FIG. 18.

FIG. 18 illustrates a third example of a table for changing the exposure condition according to the motionless image and the motion-blurred image. For example, if the shading of the motionless image is set lighter when the bright ness of the object is 10 EV, the first exposure condition is set to 9.5 EV and the second exposure condition is set to 8.2 EV. More specifically, when the exposure condition is 10 EV, the exposure amount is acquired by the following expression, $$2^{10} = 1024.$$

When the image is picked up twice, it is defined that the first exposure condition is 9.5 EV, the exposure amount is acquired by the following expression, $$2^{9.5} = 724.1.$$

The lacking light amount is, $$299.9 (= 1024 - 724.1),$$

and the exposure condition is, log(299.9)=8.228 EV is acquired, that is about 8.2 EV.

When the image is picked up as described above, since the motionless image is lacking the light amount more than the reference exposure setting, the image becomes dark. Conversely, the exposure of the motion-blurred image has a more light amount than the reference, the image becomes bright. Here, the setting is selected from among three types of deep, middle, light. However, the table may have more meticulous settings with similar calculations. In this example, the device for changing the target exposure is set as the ISO sensitivity, however, the aperture switching, shutter speed switching, the ND filter removing/pressing can be performed for the similar effect.

Figure 19:
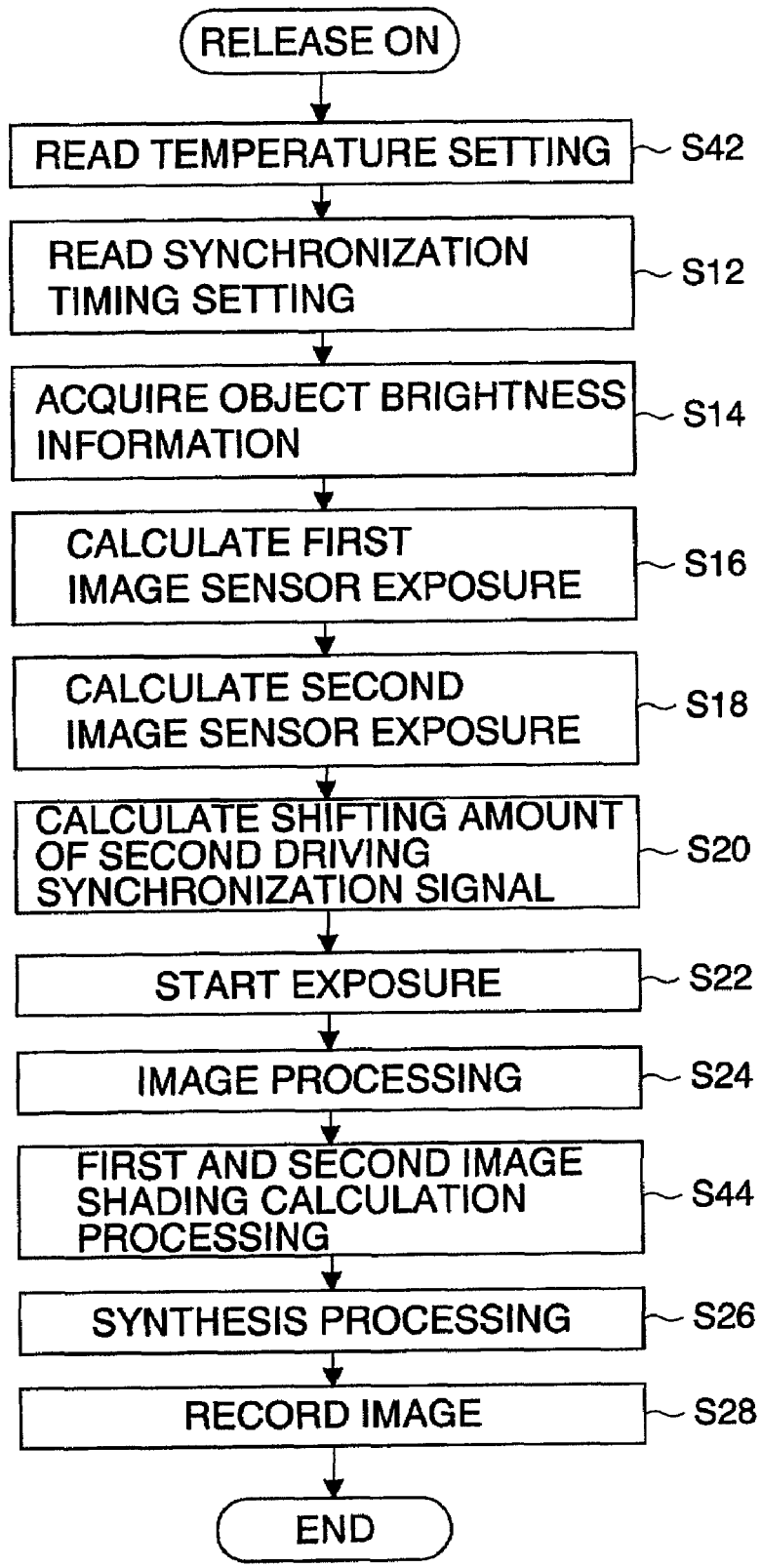
FIG. 19 is a flowchart illustrating a fourth embodiment of the image pick-up method according to the present invention.

FIG. 19 is a flowchart illustrating a fourth embodiment of the image pick-up method according to the present invention. In FIG. 19, the same step numerals are given to the steps in common with the flowchart of the third embodiment illustrated in FIG. 17 and the details of the description will be omitted.

In FIG. 19, a shading calculation of the first image (motionless image) and the second image (motion-blurred image) is added between the image processing (step S24) and the image synthesis processing (step S26).

FIG. 20 illustrates a fourth example of a table for changing the brightness of the image signal according to the shading settings of the motionless image and the motion-blurred image. In step S44 of the shading calculation in FIG. 19, according to the shading setting read in step S42, the brightness of the first image signal and the second image signal are multiplied by the factor illustrated in the table in FIG. 20.

For example, when the shading of the motionless image is set to "deep", the brightness of the first image signal is multiplied 1.2 times, and the brightness of the second image signal is multiplied 0.8 times. When "light" is set, the brightness of the first image signal is multiplied 0.8 times, and the brightness of the second image signal is multiplied 1.2 times.

Figure 21A:
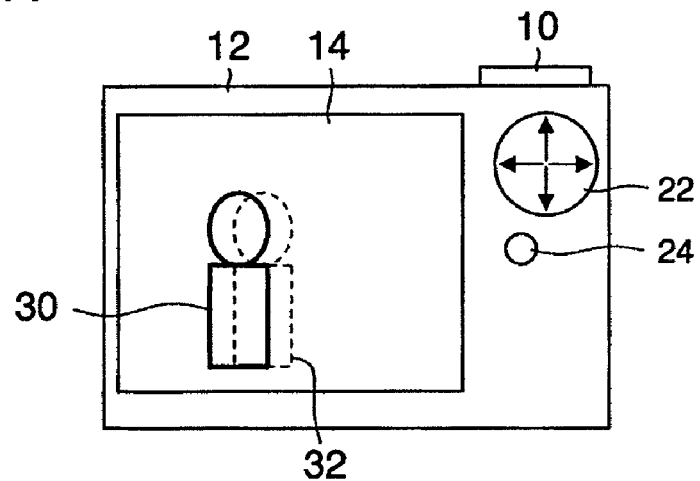
FIGS. 21A to 21C are rear face views of a camera provided with one embodiment of a motion-blur effect setting device.
Figure 21B:
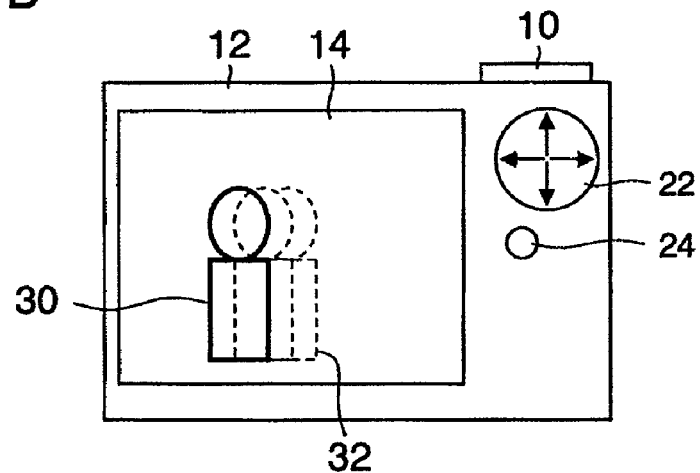
Figure 21C:
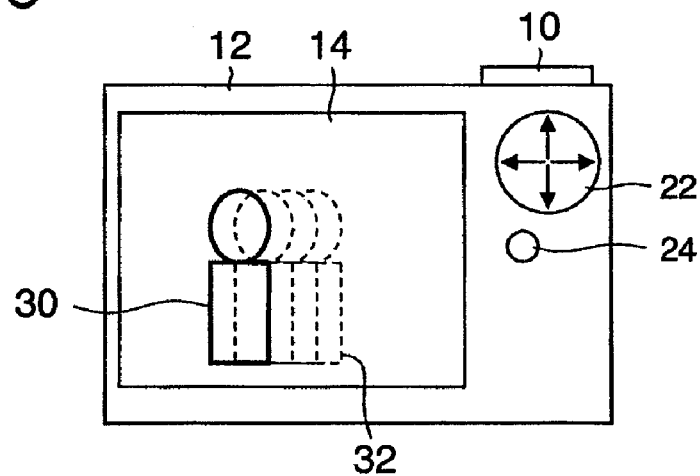

FIGS. 21A to 21C illustrate one example of the motion-blur effect setting device for setting the size of the motion-blur of the motion-blurred image. On the image display unit 14 provided on the rear face portion 12 of the digital camera, there are pictures 30 of the solid lines representing a head and body, and one or a plurality of similar pictures 32 representing persons with dotted lines shifted rightward.

On a portion which is not the image display unit 14 of the rear face of the camera, the button 22 for indicating a direction and a set button 24 are provided. The button 22 for indicating the direction is moved right and left so that a number of the pictures 32 of the dotted lines can be increased and decreased. The number of the pictures 32 shown by the dotted lines indicates the size of the motion-blur. It is indicated that the more the number of the pictures 32 are, the slower the shutter speed becomes.

The number of displayed pictures 32 becomes desirable, pressing the lens 24 to set. This example includes three pictures 32 of the dotted lines for settings; however more meticulous settings may be adopted. The more meticulously the settings become, the more appropriately the size of the motion-blur desired by the user can be set. The motion-blur effect set here determines the shutter speed of the second image sensor 8.

For example, assuming that when pictures 32 of the dotted lines are doubled as illustrated in FIG. 21B, the second shutter speed is indicated as 1/15 seconds. When the picture 32 of the dotted lines is single as illustrated in FIG. 21A, the second shutter speed is indicated as 1/30 seconds. When the picture 32 of the dotted lines is triple as illustrated in FIG. 21C, the second shutter speed is indicated as 1/8 seconds. These shutter speeds (not illustrated) may be displayed by numerals on the image display unit 14. In this case, the numeral values can be changed and displayed according to increasing/decreasing of the number of the pictures 32 shown by the dotted lines.

Figure 22:
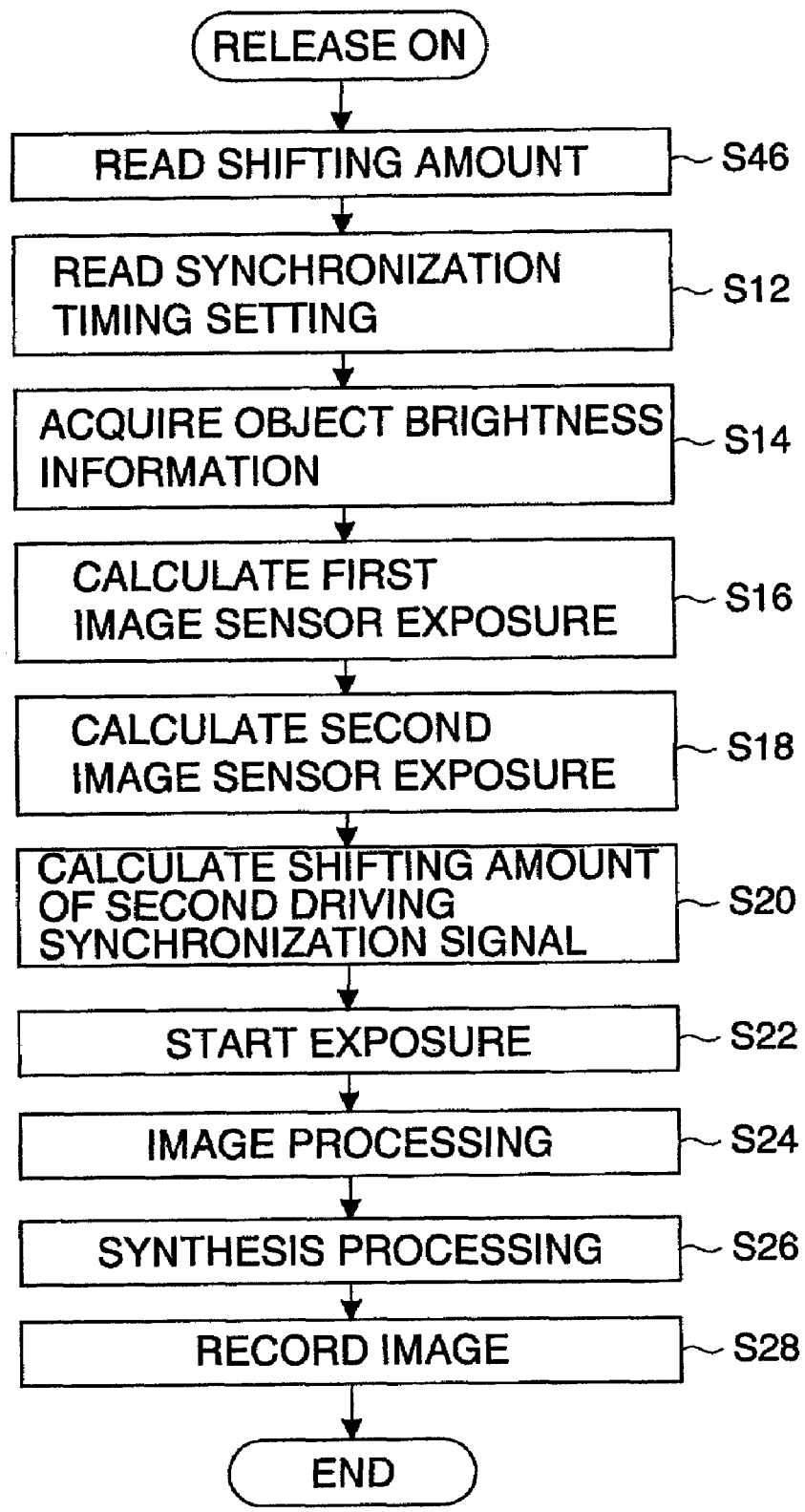
FIG. 22 is a flowchart illustrating a fifth embodiment of the image pick-up method according to the present invention.

FIG. 22 is a flowchart illustrating a fifth embodiment of the image pick-up method according to the present invention. In FIG. 22, the same step numerals are given to the steps in common with the flowchart of the fourth embodiment illustrated in FIG. 19, and the details of the description will be omitted.

FIG. 22 and FIG. 19 are different in that, instead of the process (step S42) for reading the shading settings in FIG. 19, a process (step S46) for reading the setting of the amount of motion-blur (motion-blur amount) is provided.

The motion-blur amount (motion-blur effect) read in step S46 in FIG. 22 is used for setting the first and second shutter speed of the first image sensor 6 and the second image sensor 8 in steps S18 and S20.

FIG. 23 is a fifth example of a table for changing the shutter speed of the second image sensor 8 according to the setting of the motion-blur effect setting device. When the motion-blur amount is set by the motion-blur effect setting device, the difference between the first shutter speed and the second shutter speed is set according to the motion-blur effect conversion table stored in the image pick-up control device 60.

As illustrated in FIG. 23, a difference between the first shutter speed and the second shutter speed is normally 3 Tv. When the motion-blur effect needs to be decreased one step, the difference is set to 2 Tv. When the first shutter speed is set to 7 Tv, the difference is set to 5 Tv. The second shutter speed is set faster as described above so that the motion-blur amount can be decreased. When the motion-blur effects needs to be further decreased, the difference between the first shutter seed and the second shutter speed may be further decreased. On the other hand, the motion-blur effect needs to be increased, similarly, the difference between the first shutter speed and the second shutter speed may be increased.

FIG. 24 illustrates another example (sixth example) of a table for changing the shutter speed of the second image sensor 8 according to the setting of the motion-blur effect setting device. Unlike the fifth example in the FIG. 23, regardless of the first shutter speed, the second shutter speed is set to 1/15 second as a reference. When the motion-blur effect needs to be decreased, the high-speed shutter speed 1/30 that is faster than the reference is adopted to decrease the motion-blur. When the motion-blur effect needs to be increased, the low-speed shutter speed 1/8 seconds that is slower than the reference is adopted to increase the motion-blur. The reference value is not limited to 1/15 seconds, however, for various kinds of shutter speeds as illustrated in FIG. 2, the second shutter speed is appropriately changed to set the size of the motion-blur. Here, the example includes three types of the motion-blur effects such as small, average, large, however, more meticulous settings may be performed. The shutter speed can be further increased or decreased according to the settings, and more meticulous settings of the motion-blur can be performed.

The present invention is useful to be applied for a camera for a beginner who desires an image having a slow synchronized flash effect that is hard to be picked up.

While examples and embodiments of the present invention have been explained in detail, the present invention is not limited to the explanation, needless to say, various improvements and modifications may be added without departing from the scope of the present invention.

For example, a recording medium (for example, a ROM) storing a program for causing a processor (computer) to control an image pick-up device so that the image pick-up device can implement the image pick-up method according to any one of the embodiments, can also achieve the aim of the present invention. In this case, the recording medium on which the program is recorded is installed in an image pick-up apparatus, and a processor of the image pick-up apparatus executes the program so as to enable the image pick-up apparatus to perform the steps of the image pick-up method according to any one of the embodiments.

What is claimed is:

1. An image pick-up apparatus comprising:
   a first and a second image sensors for photo-electrically converting image light entering from an object via an image lens and outputting a first and a second image signals;
   a light dispersing device for dispersing the image light on a light path of the image light and causing the image light to enter the first and second image sensors;
   a first and a second exposure time control devices for controlling respective exposure time of the first and second image sensors;
   a photometering device for photometering brightness of the object;
   an exposure condition setting device for setting exposure times of the first and second image sensors based on the photometered brightness of the object by the photometering device, and for setting a first exposure time when motion-blur of a moving object is not generated and a second exposure time when the motion-blur is generated;
   an image pick-up control device for picking-up by controlling the first and second exposure time control device based on the first and second exposure time set by the exposure condition setting device;
   an image synthesis device for synthesizing an image having a slow synchronized flash effect based on the first and second image signals output from the first and second image sensors after the photographing; and further comprising
   a synchronization timing input device for selecting a relationship of the first and second exposure times from among at least three synchronization timings including: an early act sync in which exposure starting timings substantially coincide; a middle sync in which middle times of the first and second exposure times substantially coincide, and a later act sync in which exposure ending timings substantially coincide, wherein
   the exposure condition setting device sets timings of exposure in each of the first and second image sensors based on the relationship selected by the synchronization timing input device; and
   a first and a second pick-up synchronization signal generation devices for outputting a first and a second pick-up synchronization signals for controlling each driving of the first and second image sensors, wherein
   the first and second exposure time control devices include electronic shutters for controlling exposure ending timings based on pick-up synchronization signals generated by the first and second pick-up synchronization signal generation devices, and
   the image control device controls relative phases of the first pick-up synchronization signal and the second pick-up synchronization signal according to the synchronization timing selected by the synchronization timing input device,
   wherein when the early act sync is selected, said synchronization timing device shifts phases at least one of the first pick-up synchronization signal and the second synchronization signal to align rising edges of the first exposure time and second exposure time align with a rising edge of the second synchronization signal, and wherein when said late act sync is selected, aligning phases of at least one of a first pick-up synchronization signal and a second pick-up synchronization signal to align falling edges of the first exposure time and second exposure time.

2. The image pick-up apparatus according to claim 1, further comprising
   a device for detecting a focal length of the image lens,
   wherein the exposure condition setting device sets at least the first exposure time of the first and second exposure times according to the detected focal length of the image lens.

3. The image pick-up apparatus according to claim 1, further comprising
   an image display unit for displaying graphics indicating synchronization timings including the early act sync, the middle curtain sync, and the later act sync, wherein
   the synchronization timing input device selects the synchronization timing according to the graphics displayed on the image display.

4. The image pick-up apparatus according to claim 3, further comprising a synchronizing time display, said display including plural points representative of a whole exposure time of a slow shutter, said plural points being indicated based on a relative timing to the slow shutter time used for synchronization.

5. The image pick-up apparatus according to claim 1, further comprising
   a first and a second drivers respectively connected to the first and second exposure time control devices, wherein
   the first and second exposure time control devices includes mechanical shutters driven by the first and second drivers.

6. The image pick-up apparatus according to claim 1, further comprising
   a light amount adjustment device provided between the light dispersing device and at least one image sensor of the first and second image sensors on a light path of the image light, the light amount adjustment device adjusting light amounts of each light entering the first and second image sensors.

7. The image pick-up apparatus according to claim 1, wherein
   the light dispersing device disperses the image light at a predetermined ratio so that a light amount entering the first image sensor is more than a light amount entering the second image sensor.

8. The image pick-up apparatus according to claim 1, further comprising
   a sensitivity adjustment device for independently adjusting a gain of the first image signal output from the first image sensor and a gain of the second image signal output from the second image sensor.

9. The image pick-up apparatus according to claim 1, further comprising
   a predetermined table in which a first exposure condition and second exposure condition including at least the first exposure time and the second exposure time according to the brightness of the object, wherein the exposure condition setting device sets the first and second exposure conditions according to the photometered brightness of the object and the predetermined table.

10. The image pick-up apparatus according to claim 1, further comprising
a shading setting device for setting a shading of at least one of the first and second image signals or a shading ratio thereof, wherein
the exposure condition setting device sets the first and second exposure times according to the shading or shading ratio set by the shading setting device.

11. The image pick-up apparatus according to claim 10, wherein said shading setting device includes multistep-variably setting the ratio between the shading of a motionless first image obtained from the first image signal and the shading of a motion-blurred second image obtained from the second image signal based on user operation.

12. The image pick-up apparatus according to claim 1, further comprising
a shading setting device for setting a shading of at least one of the first and second image signals and a shading ratio thereof, wherein
the synthesis device changes a ratio of the first and second image signals in the image synthesis according to the shading or the shading ratio set by the shading setting device.

13. The image pick-up apparatus according to claim 12, wherein said shading setting device includes multistep-variably setting the ratio between the shading of a motionless first image obtained from the first image signal and the shading of a motion-blurred second image obtained from the second image signal based on user operation.

14. The image pick-up apparatus according to claim 1, further comprising
a motion-blur effect setting device for setting a size of motion-blur of the moving object,
wherein the exposure condition setting device changes the second exposure time according to the size of the motion-blur set by the motion-blur effect setting device.

15. The image pick-up apparatus according to claim 14, further comprising a motion-blur effect setting device for setting a size of the motion-blur based on user operation by displaying image samples due to differences in size of the motion-blur on an image display unit.

16. An image pick-up apparatus according to claim 1, wherein when the middle sync is selected, shifting phases at least one of the first pick-up synchronization signal and the second synchronization signal to align a mid point of the first exposure time and a mid point of second exposure time align with a rising edge of the second synchronization signal.

17. An image pick-up apparatus according to claim 1, further including a late phase non-continuous sync in which first exposure time starts after the second exposure time is finished and an early phase non-continuous sync in which first exposure time ends before the second exposure time starts can be selected.

18. An image pick-up method comprising:
dispersing image light entered from an object via an image lens and causing each of a first and a second image sensors to form an image;
photometering brightness of the object;
setting each exposure condition including exposure times of the first and second image sensors based on the photometered brightness of the object, and setting a first exposure time when motion-blur of a moving object is not generated and a second exposure time when the motion-blur is generated;
controlling exposure of the first and second sensors based on the set first and second exposure times set when an image is picked up;
synthesizing an image having a slow synchronized flash effect based on a first and a second image signals output from the first and second image sensors after the image is picked up; and further comprising
synchronization timing for selecting a relationship of the first and second exposure times from among at least three synchronization timings including: an early act sync in which exposure starting timings substantially coincide; a middle sync in which middle times of the first and second exposure times substantially coincide, and a later act sync in which exposure ending timings substantially coincide, wherein
the exposure condition setting sets timings of exposure in each of the first and second image sensors based on the relationship selected by the synchronization timing; and
a first and a second pick-up synchronization signal generating for outputting a first and a second pick-up synchronization signals for controlling each driving of the first and second image sensors, wherein
the first and second exposure timing controls electronic shutters for controlling exposure ending timings based on pick-up synchronization signals, and
controlling relative phases of the first pick-up synchronization signal and the second pick-up synchronization signal according to the synchronization timing selected by the synchronization timing,
wherein when the early act sync is selected, shifting phases at least one of the first pick-up synchronization signal and the second synchronization signal to align rising edges of the first exposure time and second exposure time align with a rising edge of the second synchronization signal, and wherein when said late act sync is selected, aligning phases of at least one of a first pick-up synchronization signal and a second pick-up synchronization signal to align falling edges of the first exposure time and second exposure time.

19. The image pick-up method according to claim 18, further comprising:
setting a shading of at least one of the first and second image signals and a shading ratio thereof; and
setting the first and second exposure times so that the set shading or the shading ratio are adopted.

20. The image pick-up method according to claim 18, further comprising:
setting a shading at least one of the first and second image signals or a shading ratio thereof, and
changing the shading ratio of the first and second image signals in the image synthesis according to the set shading or the shading ratio.

21. The image pick-up method according to claim 18, further comprising:
setting a size of motion-blur of the moving object; and
changing the second exposure time according to the set size of the motion-blur.

22. A non-transitory recording medium on which a program is recorded, the program causing a processor to control an image pick-up apparatus so as to perform:
setting exposure condition including exposure time of a first image sensor based on photometered brightness of an object, setting exposure condition including exposure time of a second image sensor based on the photometered brightness of the object, setting a first exposure time when motion-blur of a moving object is not generated and a second exposure time when the motion-blur is generated;

controlling exposure of the first and second sensors based on the set first and second exposure times set when an image is picked up;

synthesizing an image having a slow synchronized flash effect based on a first image signal output from the first image sensor and a second image signal output from the second image sensor, after the image is picked up; and further comprising synchronization timing for selecting a relationship of the first and second exposure times from among at least three synchronization timings including: an early act sync in which exposure starting timings substantially coincide; a middle sync in which middle times of the first and second exposure times substantially coincide, and a later act sync in which exposure ending timings substantially coincide, wherein the exposure condition setting sets timings of exposure in each of the first and second image sensors based on the relationship selected by the synchronization timing; and a first and a second pick-up synchronization signal generating for outputting a first and a second pick-up synchronization signals for controlling each driving of the first and second image sensors, wherein the first and second exposure timing controls electronic shutters for controlling exposure ending timings based on pick-up synchronization signals, and controlling relative phases of the first pick-up synchronization signal and the second pick-up synchronization signal according to the synchronization timing selected by the synchronization timing, wherein when the early act sync is selected, shifting phases at least one of the first pick-up synchronization signal and the second synchronization signal to align rising edges of the first exposure time and second exposure time align with a rising edge of the second synchronization signal, and wherein when said late act sync is selected, aligning phases of at least one of a first pick-up synchronization signal and a second pick-up synchronization signal to align falling edges of the first exposure time and second exposure time.

23. An image pick-up apparatus comprising:
a first and a second image sensors for photo-electrically converting image light entering from an object via an image lens and outputting a first and a second image signals;
  a light dispersing device for dispersing the image light on a light path of the image light and causing the image light to enter the first and second image sensors;
  a first and a second exposure time control devices for controlling respective exposure time of the first and second image sensors;
  a photometering device for brightness of the object; an exposure condition setting device for setting exposure times of the first and second image sensors based on the photometered brightness of the object by the photometering device, and for setting a first exposure time when motion-blur of a moving object is not generated and a second exposure time when the motion-blur is generated;
  an image pick-up control device for picking-up by controlling the first and second exposure time control device based on the first and second exposure time set by the exposure condition setting device;
  an image synthesis device for synthesizing an image having a slow synchronized flash effect based on the first and second image signals output from the first and second image sensors after the photographing; and further comprising
  a shading setting device for setting a shading of at least one of the first and second image signals or a shading ratio thereof, wherein
  the exposure condition setting device sets the first and second exposure times according to the shading or shading ratio set by the shading setting device, wherein
  said shading setting device includes multistep-variably setting the ratio between the shading of a motionless first image obtained from the first image signal and the shading of a motion-blurred second image obtained from the second image signal based on user operation.

24. An image pick-up apparatus comprising:
a first and a second image sensors for photo-electrically converting image light entering from an object via an image lens and outputting a first and a second image signals;
  a light dispersing device for dispersing the image light on a light path of the image light and causing the image light to enter the first and second image sensors;
  a first and a second exposure time control devices for controlling respective exposure time of the first and second image sensors;
  a photometering device for photometering brightness of the object; an exposure condition setting device for setting exposure times of the first and second image sensors based on the photometered brightness of the object by the photometering device, and for setting a first exposure time when motion-blur of a moving object is not generated and a second exposure time when the motion-blur is generated;
  an image pick-up control device for picking-up by controlling the first and second exposure time control device based on the first and second exposure time set by the exposure condition setting device;
  an image synthesis device for synthesizing an image having a slow synchronized flash effect based on the first and second image signals output from the first and second image sensors after the photographing; and further comprising
  a shading setting device for setting a shading of at least one of the first and second image signals and a shading ratio thereof, wherein
  the synthesis device changes a ratio of the first and second image signals in the image synthesis according to the shading or the shading ratio set by the shading setting device, wherein
  said shading setting device includes multistep-variably setting the ratio between the shading of a motionless first image obtained from the first image signal and the shading of a motion-blurred second image obtained from the second image signal based on user operation.

25. An image pick-up apparatus comprising:
a first and a second image sensors for photo-electrically converting image light entering from an object via an image lens and outputting a first and a second image signals;
  a light dispersing device for dispersing the image light on a light path of the image light and causing the image light to enter the first and second image sensors;

a first and a second exposure time control devices for controlling respective exposure time of the first and second image sensors;
a photometering device for photometering brightness of the object;
an exposure condition setting device for setting exposure times of the first and second image sensors based on the photometered brightness of the object by the photometering device, and for setting a first exposure time when motion-blur of a moving object is not generated and a second exposure time when the motion-blur is generated;
an image pick-up control device for picking-up by controlling the first and second exposure time control device based on the first and second exposure time set by the exposure condition setting device; and
an image synthesis device for synthesizing an image having a slow synchronized flash effect based on the first and second image signals output from the first and second image sensors after the photographing; and further comprising a motion-blur effect setting device for setting a size of motion-blur of the moving object,
wherein the exposure condition setting device changes the second exposure time according to the size of the motion-blur set by the motion-blur effect setting device,
further comprising a motion-blur effect setting device for setting a size of the motion-blur based on user operation by displaying image samples due to differences in size of the motion-blur on an image display unit.

* * * * *